United States Patent
Rioux et al.

(10) Patent No.: US 6,959,934 B2
(45) Date of Patent: Nov. 1, 2005

(54) AIR INTAKE SYSTEM FOR STRADDLE-TYPE ALL TERRAIN VEHICLE

(75) Inventors: Roger Rioux, Magog (CA); Daniel A. Lachapelle, St-Denis de Brompton (CA); Christian Girouard, Shawinigan Sud (CA)

(73) Assignee: Bombardier Recreational Products Inc., Valcourt (CA)

( * ) Notice: Subject to any disclaimer, the term of this patent is extended or adjusted under 35 U.S.C. 154(b) by 32 days.

(21) Appl. No.: 10/437,987

(22) Filed: May 15, 2003

(65) Prior Publication Data

US 2003/0213628 A1 Nov. 20, 2003

Related U.S. Application Data

(60) Provisional application No. 60/380,291, filed on May 15, 2002.

(51) Int. Cl.$^7$ ................................. B60K 13/02
(52) U.S. Cl. ........................................ 280/68.3
(58) Field of Search ....................... 180/68.2, 68.3, 180/68.1, 908, 311, 312, 291, 292, 210, 211, 215; 123/198 E

(56) References Cited

U.S. PATENT DOCUMENTS

| | | | | |
|---|---|---|---|---|
| 3,450,117 A | * | 6/1969 | NicHattie | ............... 123/572 |
| 3,864,109 A | * | 2/1975 | Hansen | ............... 55/324 |
| 4,890,586 A | * | 1/1990 | Fujii et al. | ............ 123/184.55 |
| 4,907,552 A | * | 3/1990 | Martin | ............ 123/198 E |
| 5,692,578 A | * | 12/1997 | Miyakawa et al. | ........ 180/68.3 |
| 6,648,093 B2 | * | 11/2003 | Rioux et al. | ............... 180/291 |
| 6,820,708 B2 | * | 11/2004 | Nakamura | ............... 180/68.2 |
| 6,823,956 B2 | * | 11/2004 | Shimizu | ............... 180/68.1 |
| 2002/0023792 A1 | * | 2/2002 | Bouffard et al. | ........... 180/68.4 |
| 2002/0038737 A1 | * | 4/2002 | Morishita et al. | ........... 180/291 |
| 2002/0108795 A1 | * | 8/2002 | Kuji et al. | ............... 180/68.2 |
| 2002/0179356 A1 | * | 12/2002 | Morii et al. | ............... 180/190 |
| 2003/0029656 A1 | * | 2/2003 | Matsuura et al. | .......... 180/68.2 |
| 2004/0159482 A1 | * | 8/2004 | Eide | .......................... 180/182 |

FOREIGN PATENT DOCUMENTS

| | | | |
|---|---|---|---|
| JP | 60-153418 | * | 8/1985 |
| JP | 61-200029 | * | 9/1986 |

OTHER PUBLICATIONS

Bombardier 2003 Rally Parts Catalog, Feb. 2002, p. B3.

* cited by examiner

Primary Examiner—Bryan Fischmann
(74) Attorney, Agent, or Firm—BRP Legal Services

(57) ABSTRACT

An all terrain vehicle has a frame and front and rear wheels suspended from the frame. The vehicle includes a body structure attached to the frame having at least one ventilation opening. An engine is mounted on the frame to provide a mode of power to at least one of the front and rear wheels. An air box is connected to the frame and supplies intake air to the engine. The air box includes an intake tube connected to and receiving intake air from the at least one ventilation opening. A filter is disposed within the intake tube.

26 Claims, 28 Drawing Sheets

AIR INTAKE SYSTEM FOR STRADDLE-TYPE ALL TERRAIN VEHICLE

The present application claims priority to U.S. Provisional Application Ser. No. 60/380,291, which was filed on May 15, 2002, the entirety of which is hereby incorporated into the present application by reference.

BACKGROUND OF THE INVENTION

2. Field of the Invention

This invention relates to an improved straddle-type all terrain vehicle (ATV), and more particularly to the structure, placement, and orientation of an air intake within the ATV.

3. Description of Related Art

FIG. 1A shows a related art ATV 700 including a frame 702, a pair of front wheels 704, and a pair of rear wheels 706. The frame 702 has mounted thereto a body 708, which is shown to include front facie 711 and rear fenders 712. Additionally, the ATV 700 includes a fuel tank 714 mounted thereto.

For the ATV 700 shown in FIG. 1A, the rear wheels 706 are supplied power from an engine 718. The engine 718 generates power by combusting a mixture of fuel and air. The fuel is delivered to the engine 718 from the fuel tank 714 by a suitable means, such as a fuel pump or gravity feed. Air is pulled from the atmosphere through an air intake system, indicated at 720, mixed with the fuel in a carburetor 743, and combusted within a chamber of the engine 718. An inlet 722 of air intake system 720 is positioned between the seat 710 and fuel tank 714. Accordingly, the inlet 722 is protected from debris and water entering therethrough.

FIG. 1B shows a schematic view of the air intake system 720 and engine 718. As shown, the air intake system 720 includes a pair of intake tubes 730, which on one end thereof provide the inlet 722, and are connected to a noise suppressing enclosure or silencer 732. The silencer 732 is a substantially voluminous enclosure, which serves to attenuate intake roar of the engine 718. The silencer 732 includes a hollow molded body 734 with an upwardly facing opening 736. A closure member (e.g., lid) 738 is detachably mounted (such as with clips 739) to the body 734 thereby sealing the opening 736. It is noted that the sealing of the opening 736 may be facilitated by a pliable sealing member 740 disposed between the body 734 and closure member 738. The silencer 732 is also connected to an intake duct 742, which is connected at an opposite end to the carburetor 743. As shown, an air filter 744 is disposed within the silencer 732 and may be connected to the end of duct 742 to filter or otherwise separate particles from the air flowing from the air intake system 720 prior to delivery to the carburetor 743. As shown in FIG. 1A, the silencer 732 is positioned just behind the engine 718. The intake tubes 730 extend from the silencer 732, along an upper portion of the engine 718, to the position between the fuel tank 714 and the seat 710.

FIG. 2A is a perspective view showing another related art ATV 100. The ATV 100 includes a pair of front wheels 102 and a pair of rear wheels 103. The front wheels 102 are covered by front fenders 117 and the rear wheels 103 are covered by rear fenders 116. A front rack 105 is provided above the front fenders 117 and a rear rack 106 is provided above the rear fenders 116. A pair of apertures or ventilation openings 120, provided in the rear fenders 116, supply intake air to a radiator and fan assembly 170 (FIG. 2B), which is generally beneath a seat 107. A pair of handle bars 110 is used to steer the ATV 100.

FIG. 2B is a top plan view of the ATV 100 shown in FIG. 2A, with the seat 107 being removed and the front and rear fenders 116, 117 being shown in phantom. The front and rear wheels 102 and 103 are supported by a main frame 120, while a subframe 122, which is connected to the main frame 120 through joints 124, supports the radiator and fan assembly 170. A suitable type of power unit, e.g., an engine 150, is preferably capable of simultaneously driving the front and rear wheels 102 and 103 through a suitable transmission, although rear wheel drive only ATVs are also contemplated. The ATV 100 also includes a carburetor 152, an exhaust pipe 154, a muffler 156, and an air intake system 200, which is shown in greater detail in FIG. 3.

FIG. 3 is a schematic view illustrating an intake air system 200. An inlet end 212 of a front air intake pipe 214 is positioned at the front of the ATV 100 adjacent the steering column, just below a mounting plate 115 for mounting equipment, e.g., an instrument panel and/or a dash board. The inlet end 212 is positioned at substantially the highest point of the ATV 100 to substantially eliminate entry of mud or water caused either by immersion when traversing relatively deep water or by splashing when traversing wet terrain. The front air intake pipe 214 is connected to a sleeve 216 and a rear air intake pipe 217 that leads to the air box 201, which is positioned just below a rear portion of the seat 107. Clamps 210 secure the front air intake pipe 214 to the sleeve 216, and the sleeve 216 to the rear air intake pipe 217. Intake air from the air box 201 is supplied to the carburetor 152 using a hose 206 that is held by a clamp 210 to the carburetor 152. Air is drawn from an engine valve cover (not shown) for ventilation purposes using a vent hose 222, clamps 218 and 219, PCV valve 221, oetiker clamp 227, vent hose 213, "Y" fitting 228, hoses 229 and 230 and fitting 233. The air filter 155 is placed in the air box 201 along with a foam member 220. Air intake tubes 211 fit within the air filter 155. A cover 226 is secured by cover brackets 232 to the air intake box 201.

FIG. 4 is a perspective view showing another embodiment of an air intake system 300 attached to a frame 120 of an ATV. The air intake system 300 includes an air box 301 that is generally positioned beneath the seat 507 towards a rear portion of the ATV 500 (See FIG. 6). Specifically, the frame 120 includes a support plate 126 for supporting the bottom wall of the air box 301. As shown in FIG. 5, the air intake system 300 includes an air intake pipe 302 connected to the main body 351 of the air box 301, toward the rear of the ATV. The air intake box 301 includes a port 303 that is connected to and provides intake air to an outlet pipe 304 that leads to a carburetor 352. The air box 301 also includes ports 305A and 305B which are connected to vacuum pipe 306A and engine ventilation pipe 306B, respectively. Like the ATV shown in FIG. 1, the ATV 500 has a fender structure that includes rear fenders 516 on either side of the seat 507, as shown in FIG. 6. The rear fenders 516 include apertures or ventilation openings 520. Ventilation openings 547 are also provided in the base portion of the seat 507. The intake pipe 302 of the air box 301 is positioned such that the inlet end 312 has access to intake air that enters at least one of the ventilation openings 520, 547. As such, the ventilation openings 520, 547 provide intake air to the intake air system 300.

In the ATVs described above, the air intake system is positioned within the frame such that removal of the seat enables easy access to the air intake system. This easy access facilitated the replacement of filters that are disposed within the air box of the air intake system. However, with the advent of new frame structures for ATVs, the air intake systems are being positioned such that access to the air intake system, and the air box in particular, becomes difficult. As a result, the replacement of filters disposed within the air box becomes difficult. Accordingly, there exists a need for facilitating the replacement of filters for air intake systems regardless of the position of the air box within the frame of the ATV.

SUMMARY OF THE INVENTION

It is one aspect of the invention to facilitate the replacement of filters of air intake systems of an ATV.

According to one preferred embodiment of the present invention, an all terrain vehicle has a frame and front and rear wheels suspended from the frame. The vehicle includes a body structure attached to the frame having at least one ventilation opening. An engine is mounted on the frame to provide a mode of power to at least one of the front and rear wheels. An air box is connected to the frame and supplies intake air to the engine. The air box includes an intake tube connected to and receiving intake air from the at least one ventilation opening. A filter is disposed within the intake tube.

Other aspects, features and advantages of this invention will become apparent from the following detailed description when taken in conjunction with the accompanying drawings, which are a part of this disclosure, and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

Figure 1A:
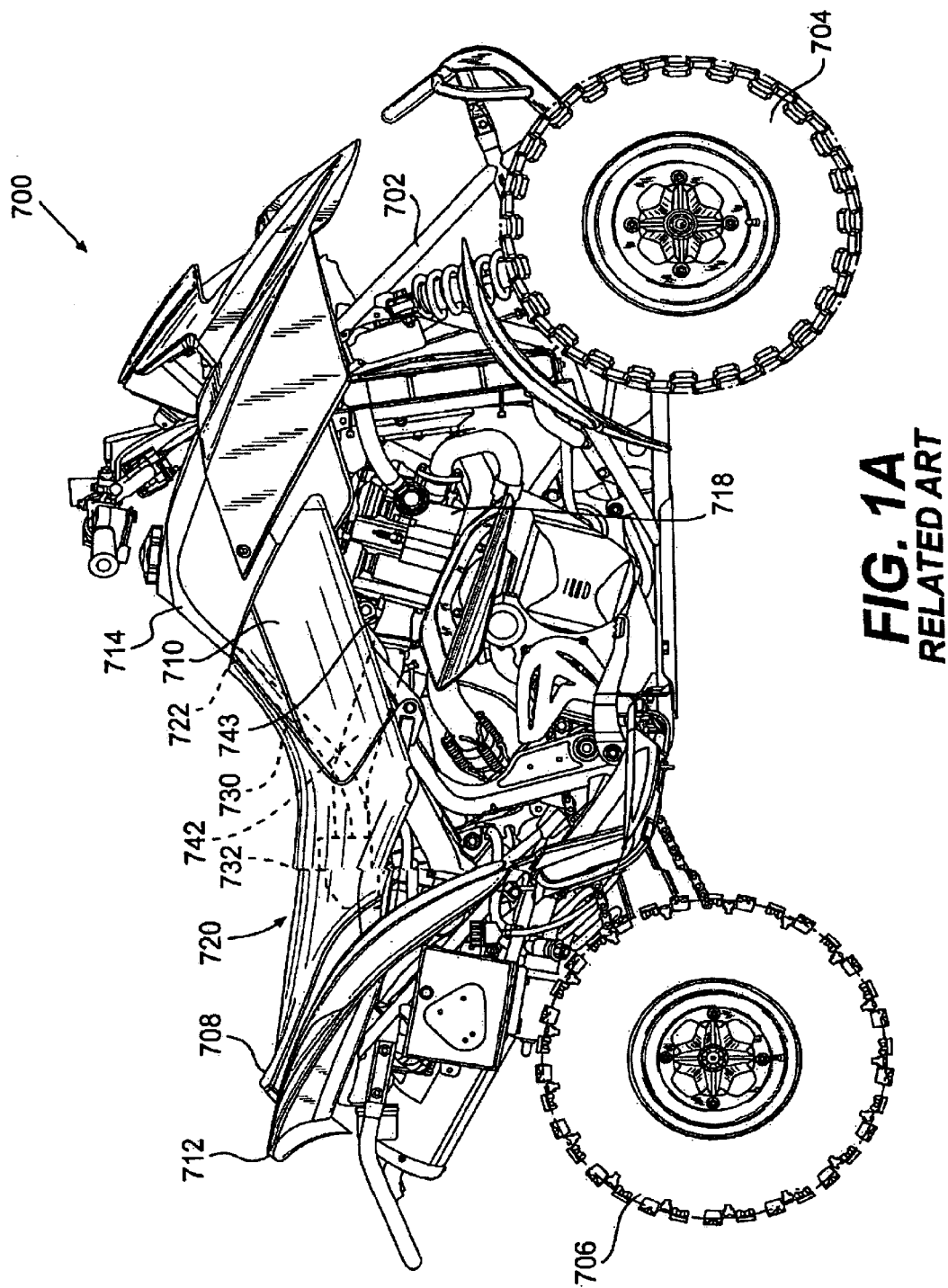
FIG. 1A is a perspective view illustrating a related art ATV.
Figure 1B:
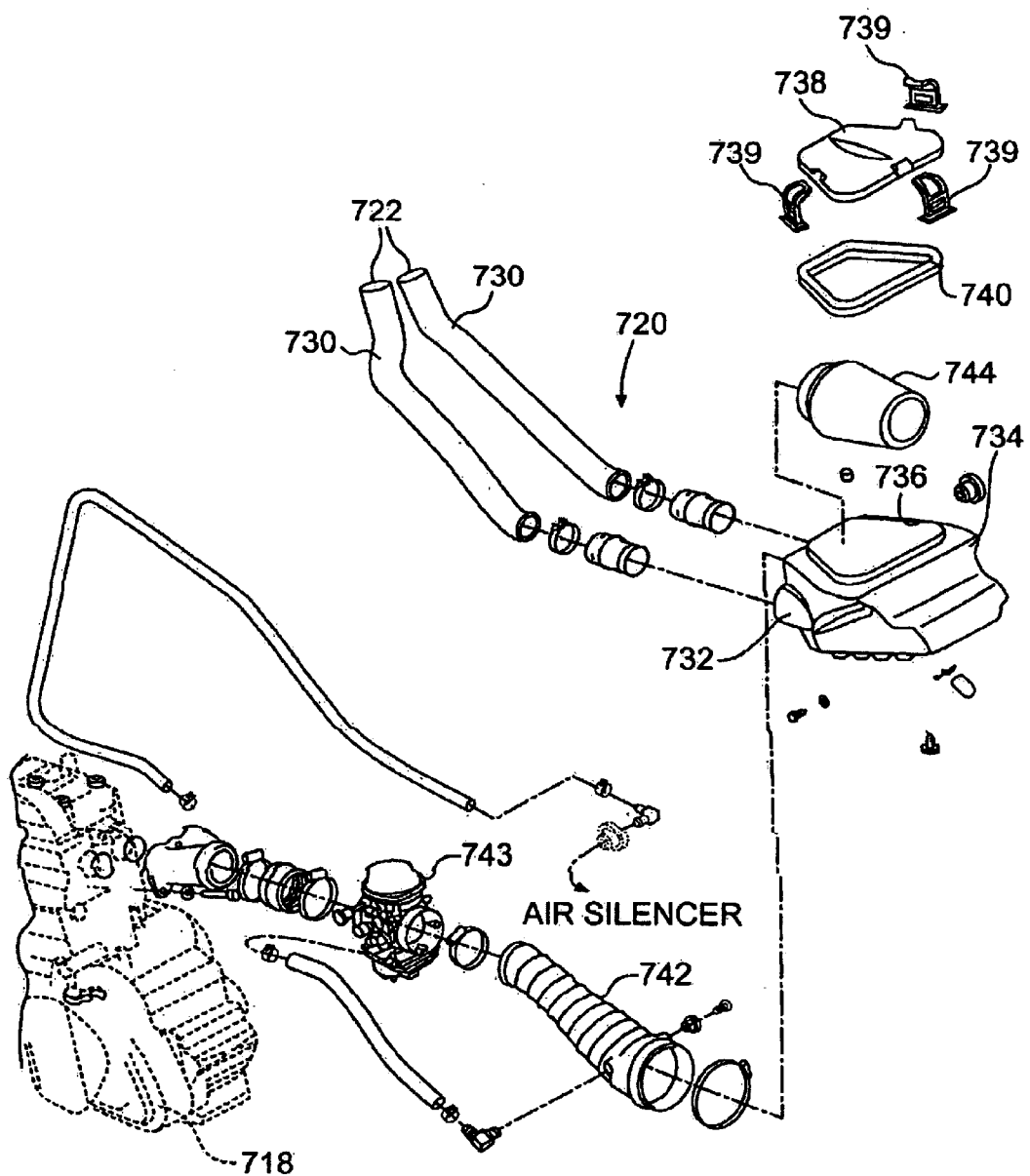
FIG. 1B illustrates an air intake system of the related art ATV shown in FIG. 1A.
Figure 2A:
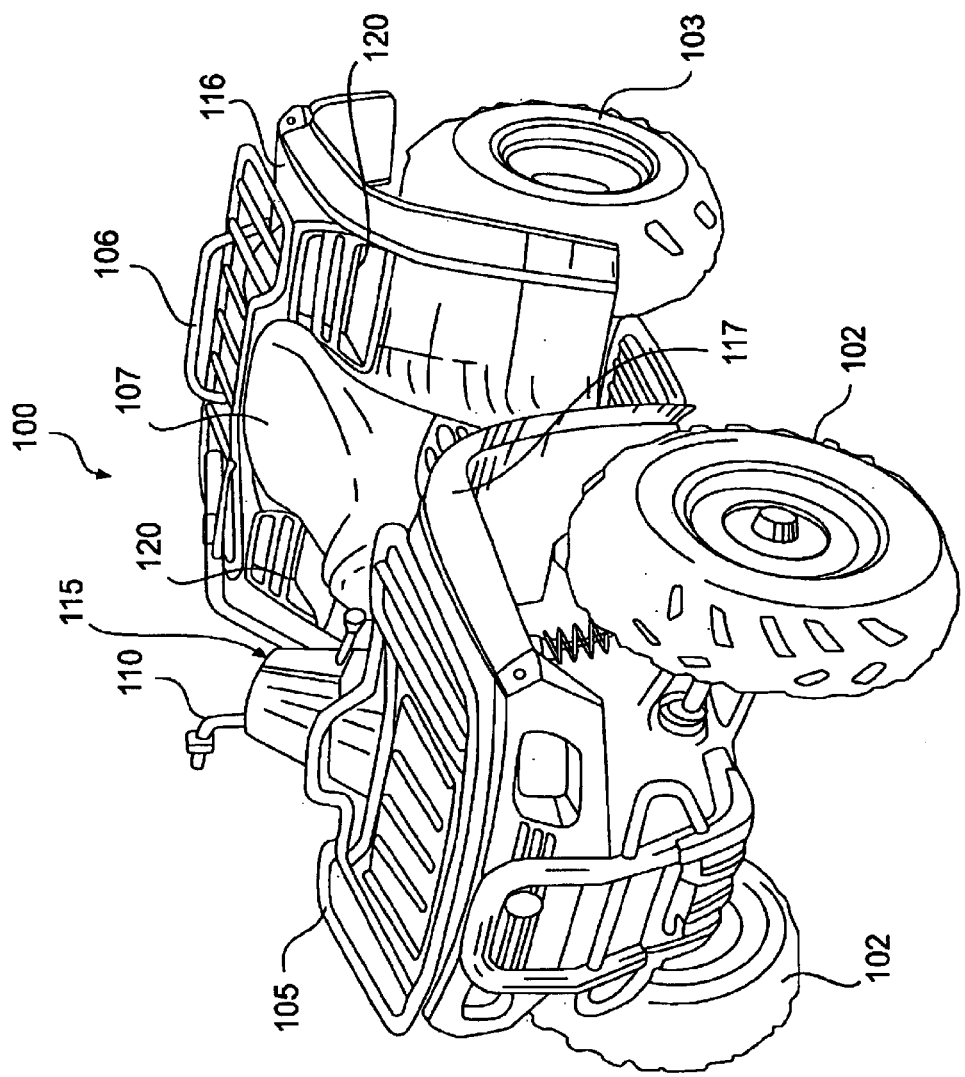
FIG. 2A is a perspective view illustrating another related art ATV.
Figure 2B:
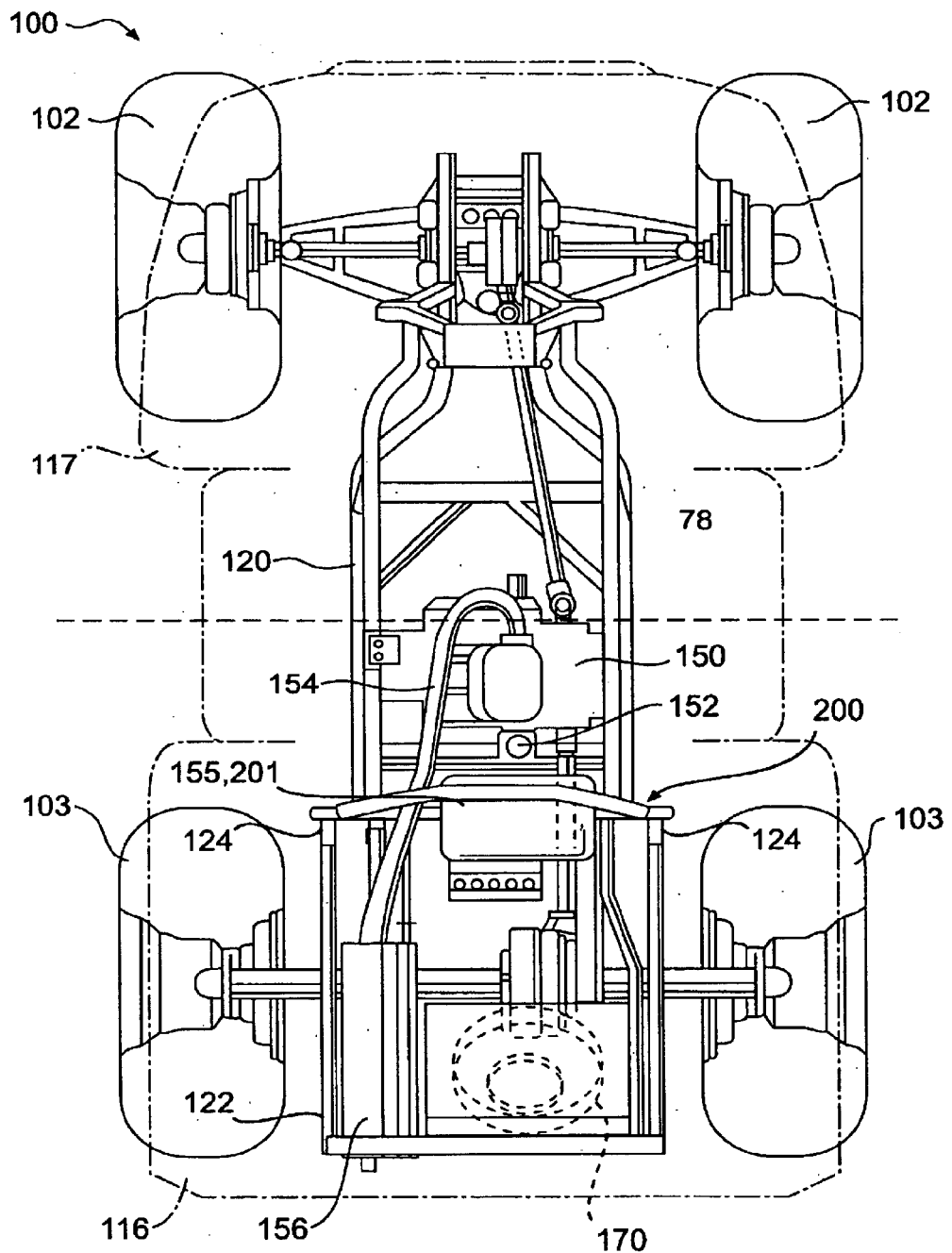
FIG. 2B is a plan view of a frame of the related art ATV shown in FIG. 2A.
Figure 3:
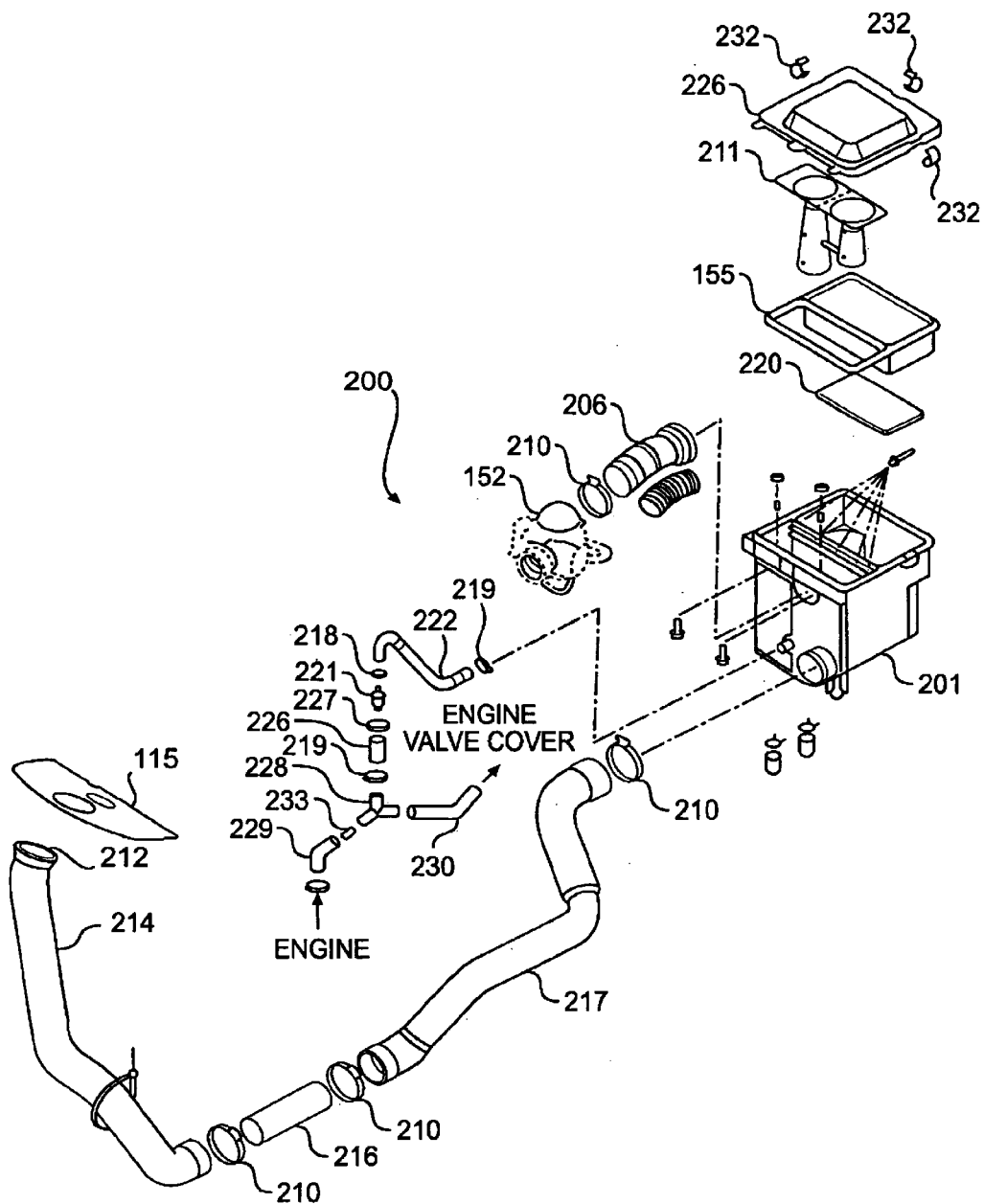
FIG. 3 illustrates an air intake system of the related art ATV shown in FIGS. 2A and 2B.
Figure 4:
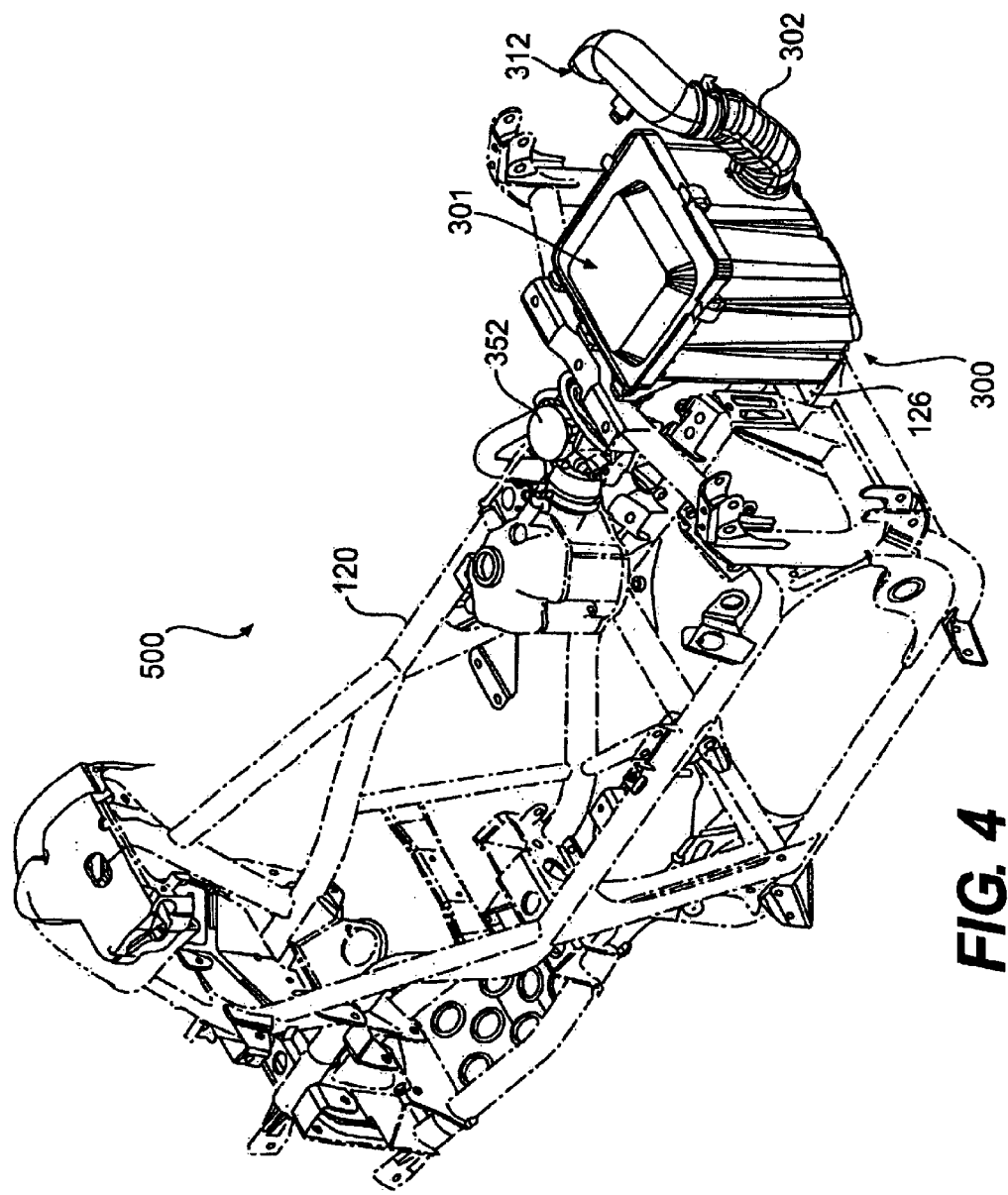
FIG. 4 is a rear perspective view of a related art air intake system attached to a frame of a related art ATV.
Figure 5:
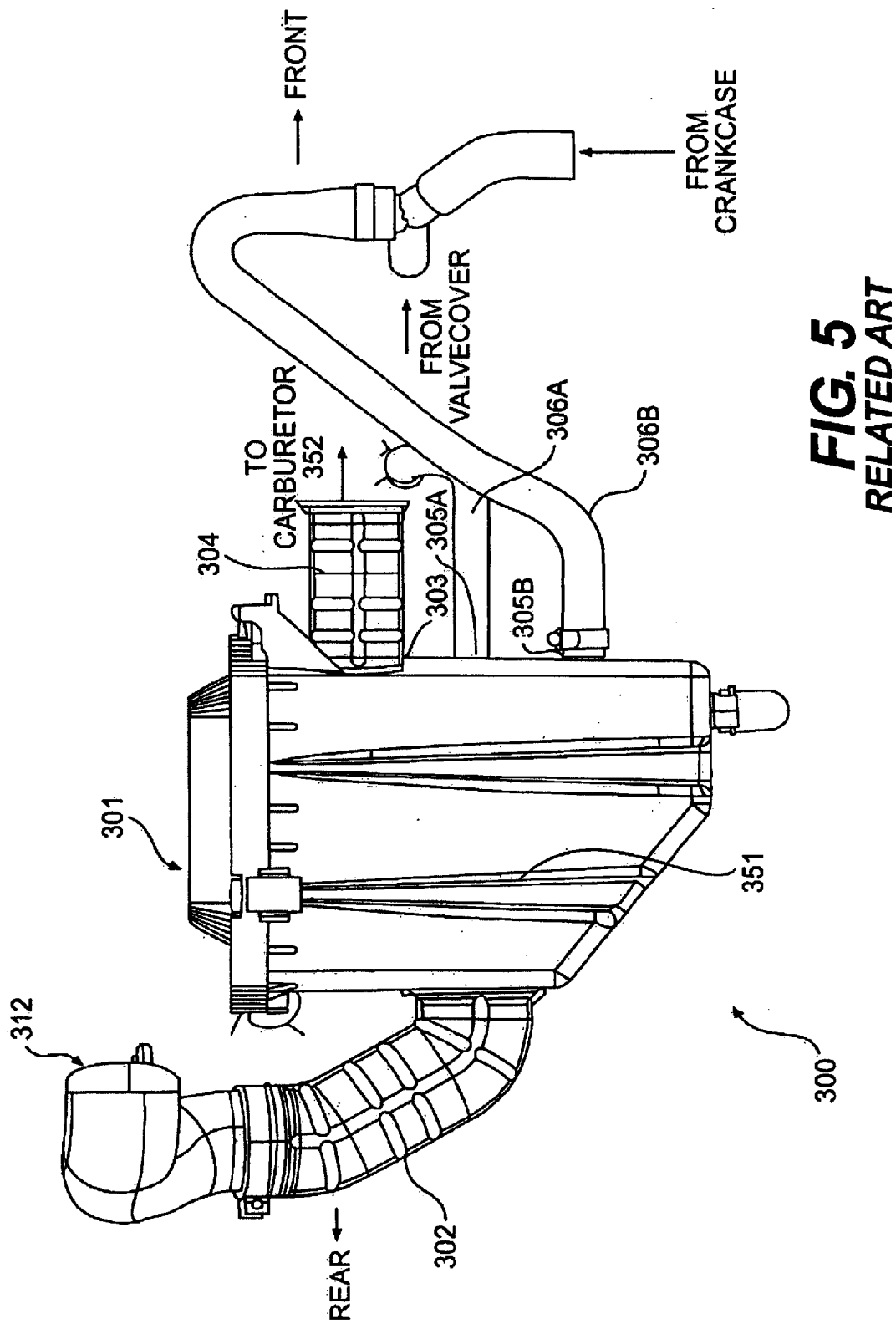
FIG. 5 is a side view illustrating the air intake system of FIG. 4.
Figure 6:
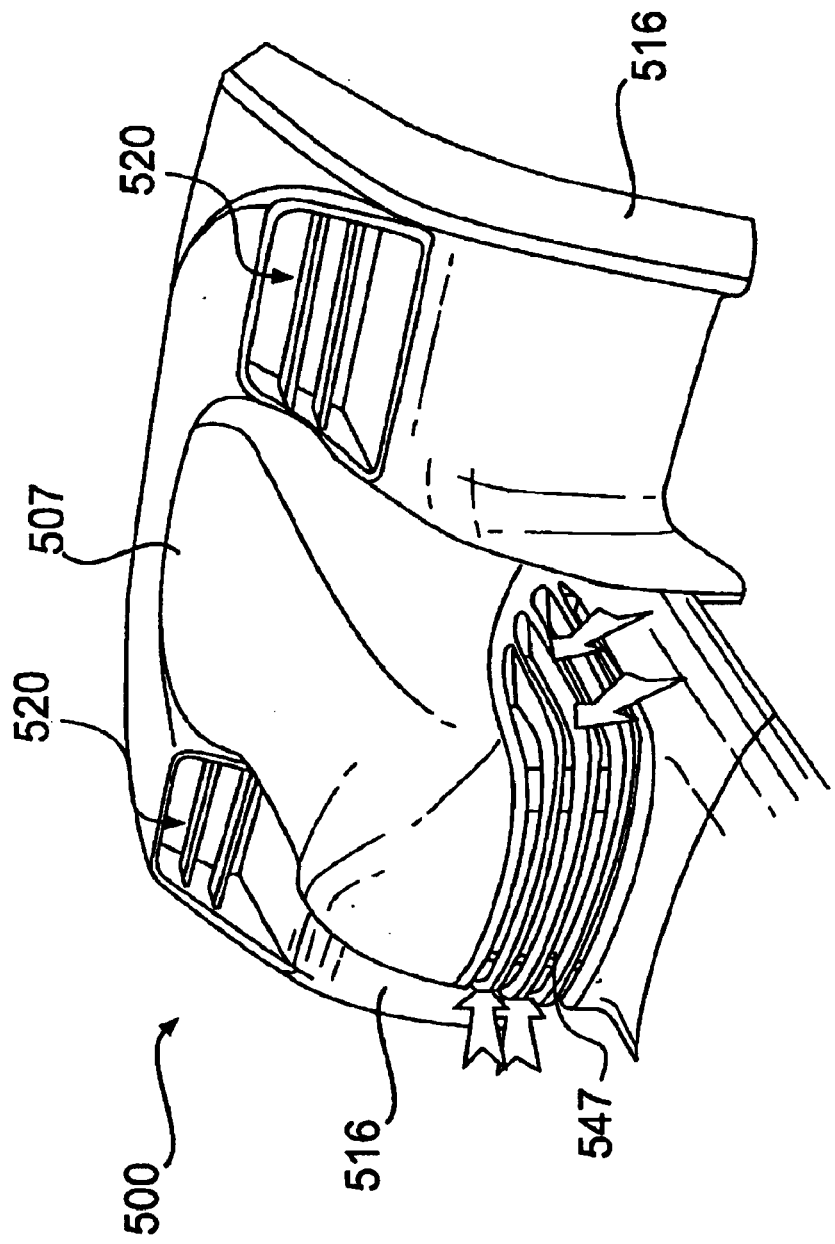
FIG. 6 is a front perspective view illustrating rear fenders with ventilation openings attached to the frame of the ATV shown in FIG. 4.
Figure 7:
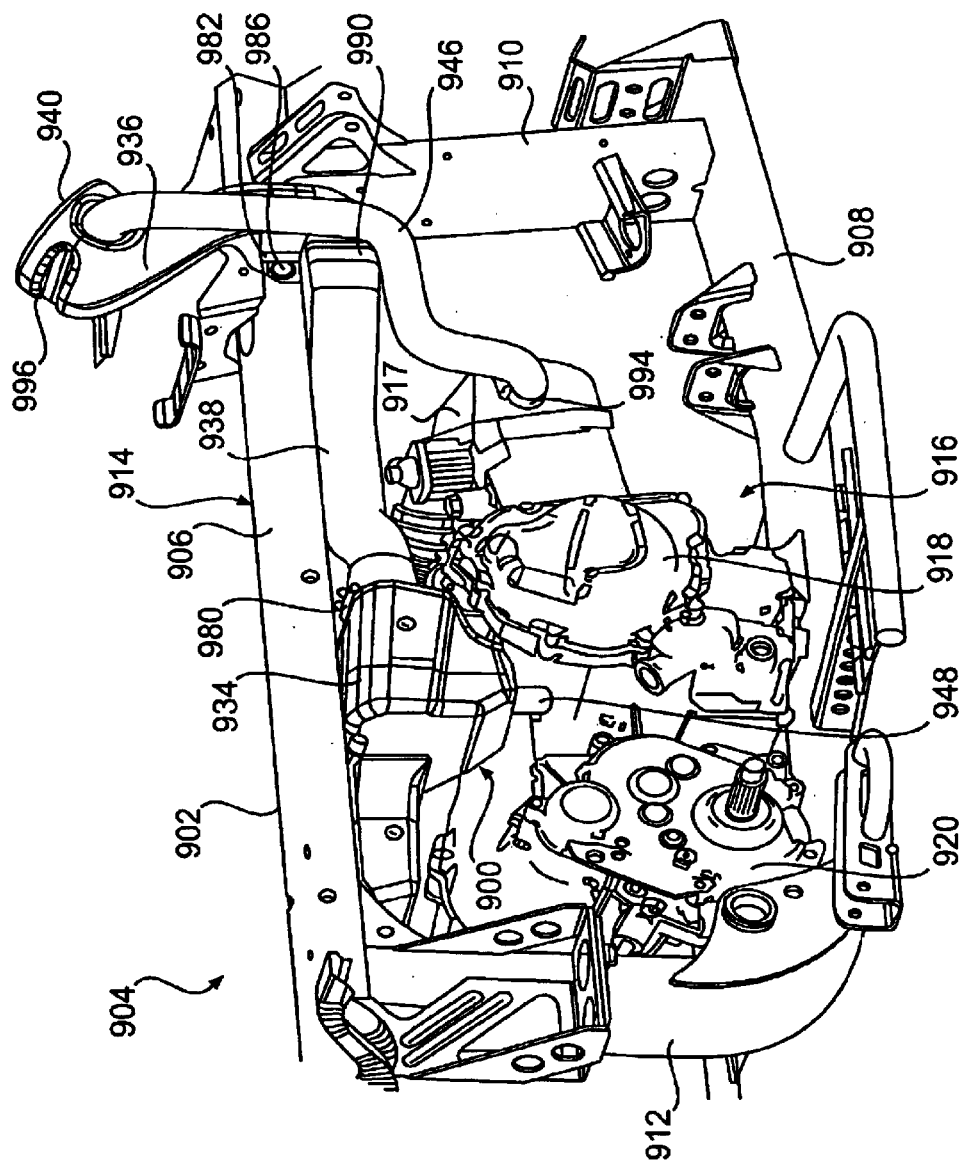
FIG. 7 is a rear right perspective view illustrating an air intake system according to one preferred embodiment of the invention attached to a frame of an ATV.
Figure 8:
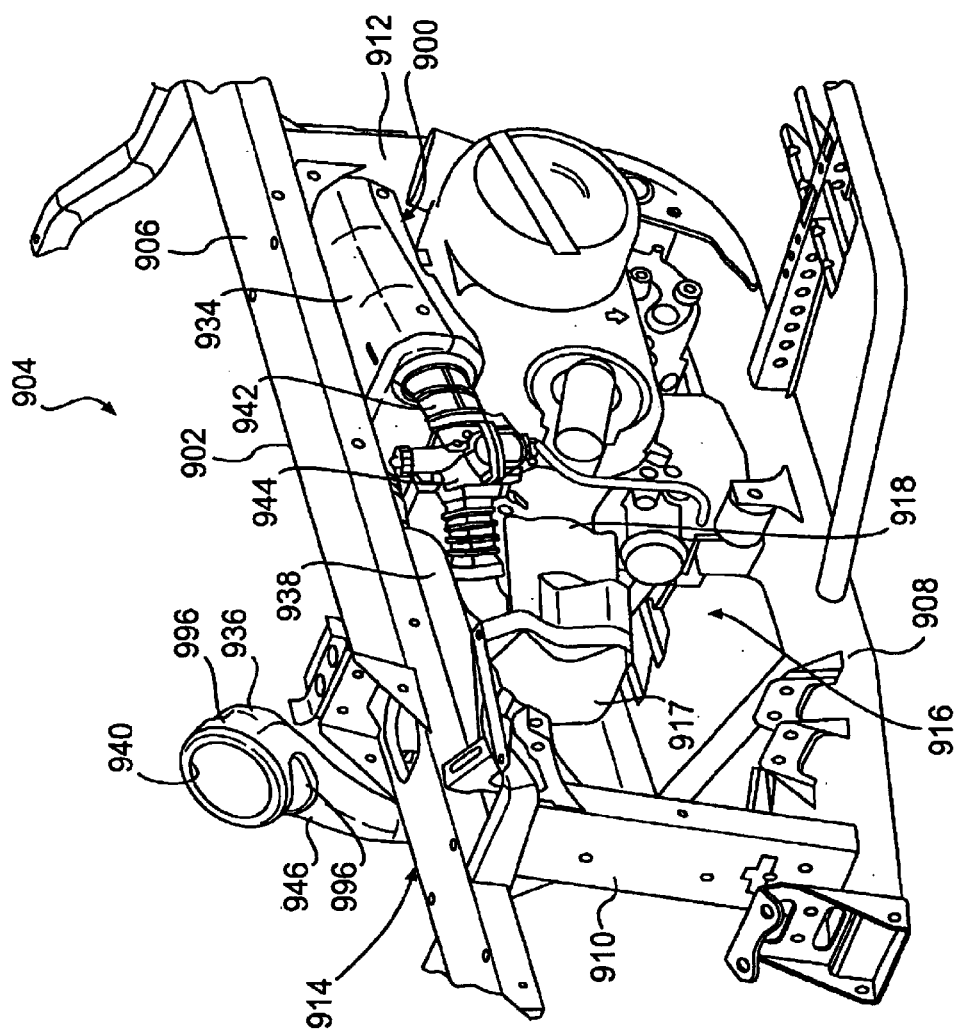
FIG. 8 is a front left perspective view illustrating the air intake system of FIG. 7.

FIGS. 7–8 illustrate an air intake system 900 according to one preferred embodiment of the invention attached to a frame 902 of an ATV 904. The body structure, forward and rearward wheel assemblies, and suspension system of the ATV 904 have been removed for clarity in FIGS. 7–8. In the configuration shown, the frame 902 includes an upper frame member 906 and a lower frame member 908. The upper and lower frame members 906, 908 are connected by forward and rearward cross members 910, 912. The upper and lower members 906, 908 and the forward and rearward cross members 910, 912 are configured to form a rigid truss structure, or support module 914. The support module 914 is defined on upper and lower sides thereof by the upper member 906 and the lower member 908, respectively. Further, the support module 914 is defined on forward and rearward sides thereof by the forward and rearward cross members 910, 912, respectively. A engine receiving space 916 of the support module 914 is provided by inner peripheries of the members 906, 908, 910, 912 and defines an engine receiving space.

An internal combustion engine 918 is securely mounted to the support module 914 within the engine receiving space 916. The engine 918 is operably coupled to at least one of the forward and rearward wheel assemblies through a transmission 920 in order to provide propulsion to the ATV 904. The transmission 920 includes a handle 922 (See FIG. 17). The handle 922 functions as a gear shifter that includes forward and reverse positions, for example.

Figure 9:
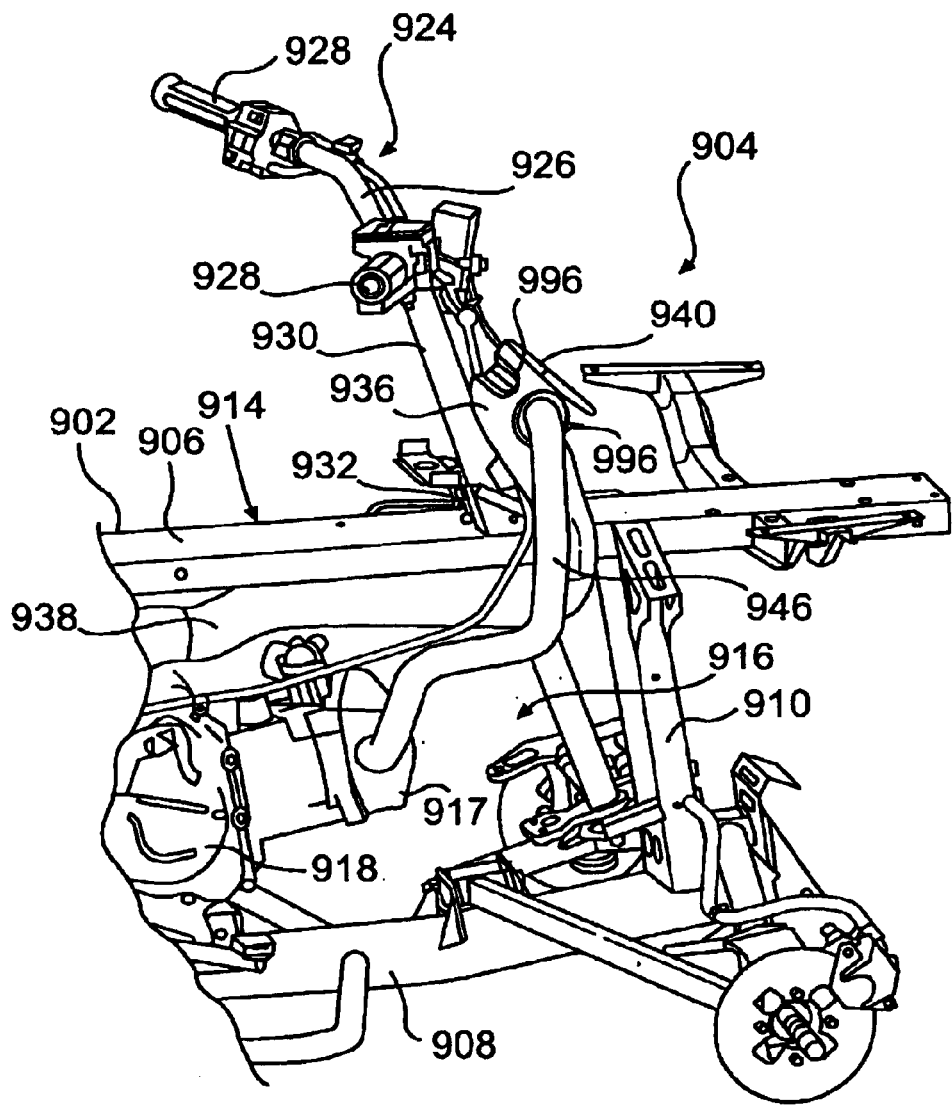
FIG. 9 is a right perspective view illustrating the air intake system of FIG. 7.
Figure 10:
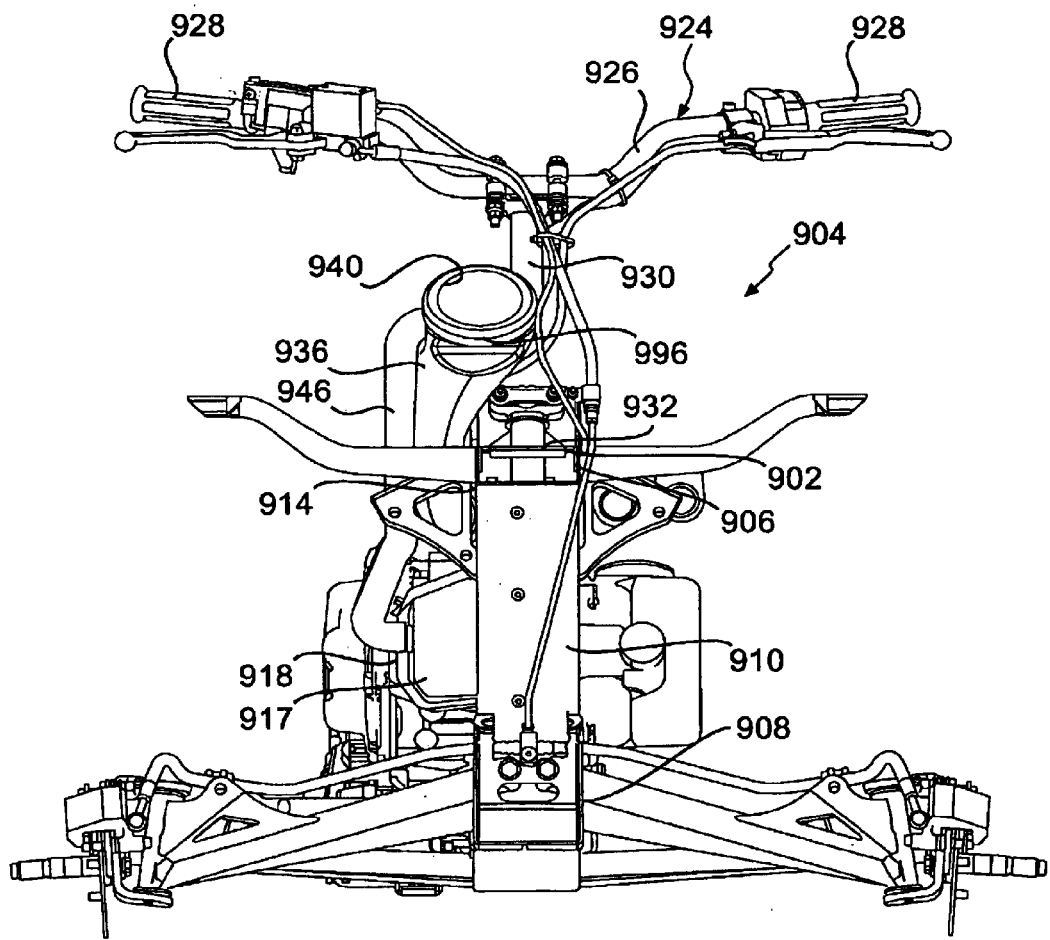
FIG. 10 is a front view illustrating the air intake system of FIG. 7.

FIGS. 9–10 show a steering assembly 924 mounted to the support module 914. The steering assembly 924 includes a steering member 926, which has grip portions 928 on opposite ends thereof, and a steering column 930 that extends generally downwardly from a central portion of the steering member 926. The upper member 906 of the support module 914 provides a generally vertically extending opening 932 therethrough, which allows the steering column 930 to pass therethrough and extend towards the lower frame member 908.

The support module 914 can support not only the engine 918, air intake system 900, and steering assembly 924 as described above, but other components of the ATV 904 as well (i.e., front and rear suspension subsystems and a body structure). It is contemplated that, depending on the ATV configuration, the support module 914 may include additional members, other than the upper and lower members 906, 908 and forward and rearward cross members 910, 912, in order to support other ATV components.

A further understanding of the details of the support module 914 and other components of the ATV 904 is not necessary in order to understand the principles of the present invention and thus will not be further detailed herein. Further details of the support module 914 are disclosed in U.S. patent application Ser. No. 09/824,878. now U.S. Pat. No. 6,799,781 entitled "FRAMES FOR ALL TERRAIN VEHICLES", the entirety of which is herein incorporated by reference. Instead, the present invention is concerned in detail with the air intake system 900 attached to the support module 914.

Referring to FIGS. 7–11, the air intake system 900 includes an air box 934 that is secured to an inner peripheral surface of the upper frame member 906 towards an intermediate portion of the ATV 904. However, it is contemplated that the specific structure and placement of the air box 934 may be altered from that shown and described herein. An air intake tube 936 is connected to the air box 934 by tube 938 and has an intake opening 940 positioned at the front of the ATV 904 adjacent the steering column 930. The air box 934 is also connected to an intake duct 942 that connects to and provides intake air to the carburetor 944 of the engine 918. An engine ventilation tube 946 extends from the intake tube 936 and is connected to the valve cover 917 of the engine 918. The air box 934 also includes a downwardly facing drain tube 948 that allows water or debris collected within the air box 934 to be removed. Thus, air is drawn into the interior of the air box 934 via the intake tube 936. The air passes through the interior of the air box 934 and exits via the intake duct 942 that is connected to the carburetor 944. However, different configurations are possible for the input to and output from the air box 934 depending on the particular design of the engine 918.

As shown in FIGS. 13–16, the air box 934 comprises a generally L-shaped hollow molded body 950 enclosing an interior space. The air box 934 is preferably formed by blow molding. However, the air box 934 may be constructed by any other suitable method. As shown in FIGS. 12–15, the body 950 includes an inlet port 952 and an outlet port 954. In the illustrated embodiment, the inlet and outlet ports 952, 954 are positioned on the same side of the air box 934 and have a generally forwardly facing orientation when the air box 934 is mounted to the support module 914. An extension 956 is provided on the inlet port 952. The extension 956 is used to attach the air box 934 to the tube 938 connected to the intake tube 936.

Figure 11:
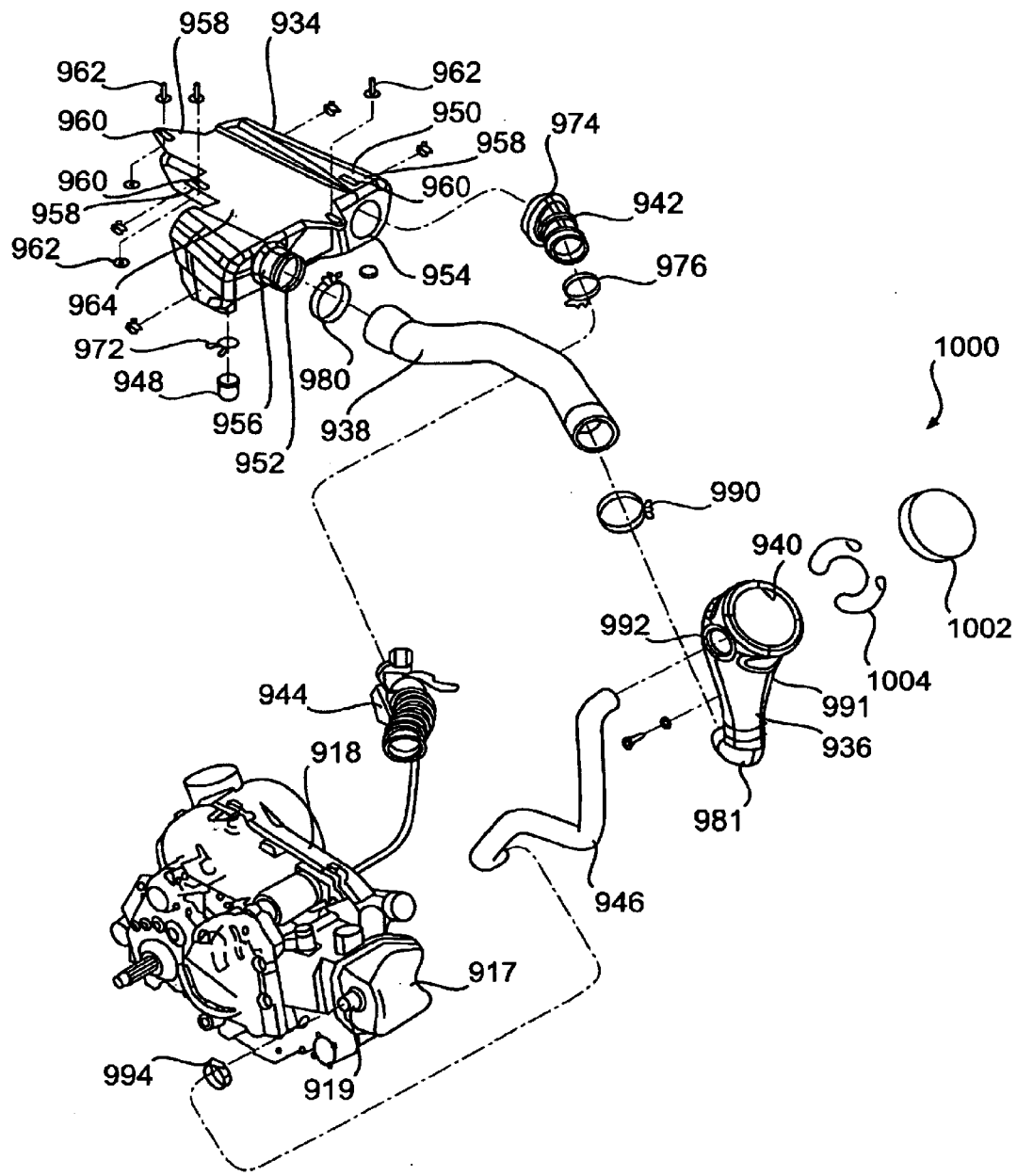
FIG. 11 is an exploded view of the air intake system of FIG. 7.
Figure 13:
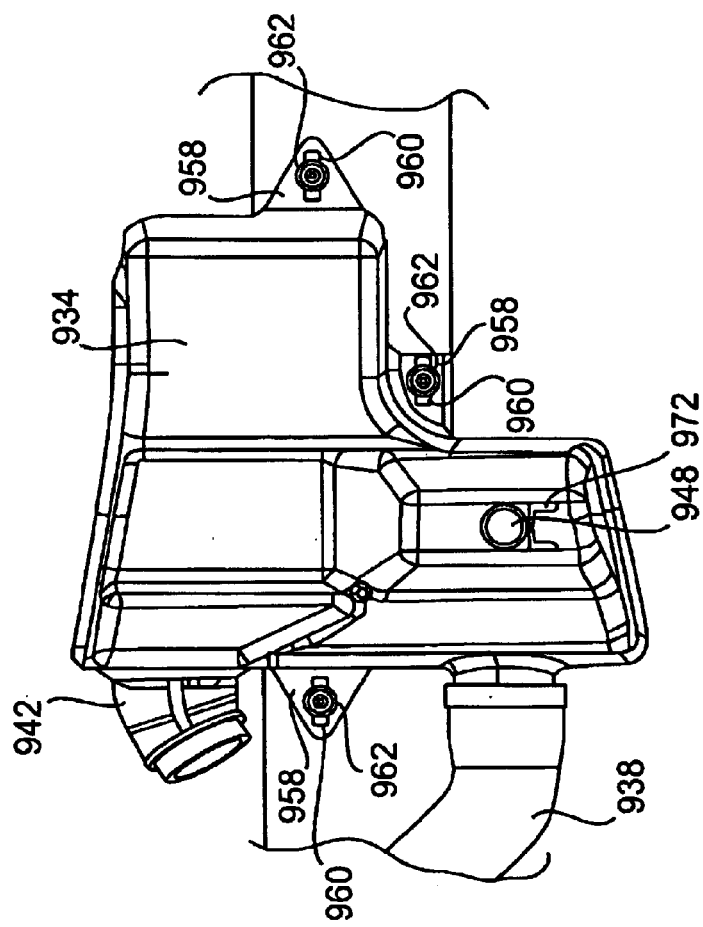
FIG. 13 is a bottom view of the air box of the air intake system.
Figure 12:
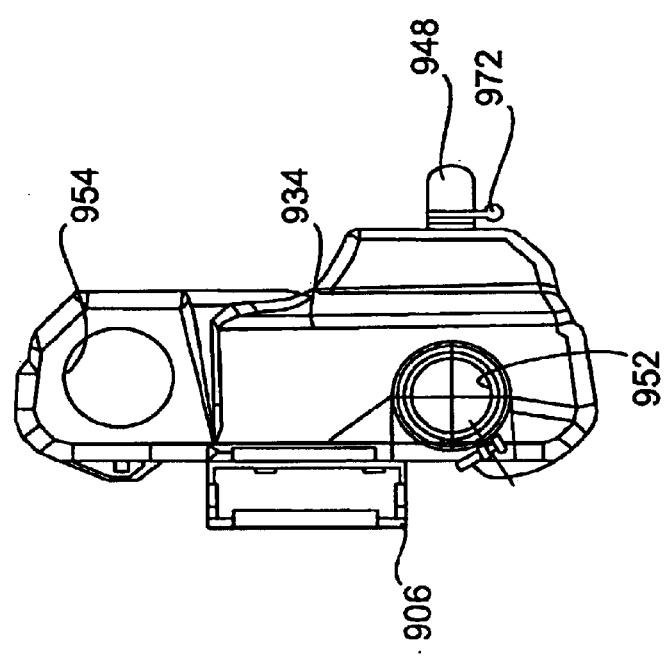
FIG. 12 is a front view of an air box of the air intake system.
Figure 15:
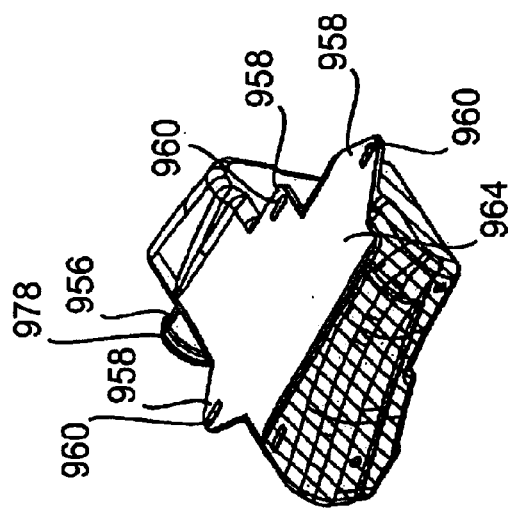
FIG. 15 is perspective view of the air box of the air intake system.
Figure 16:
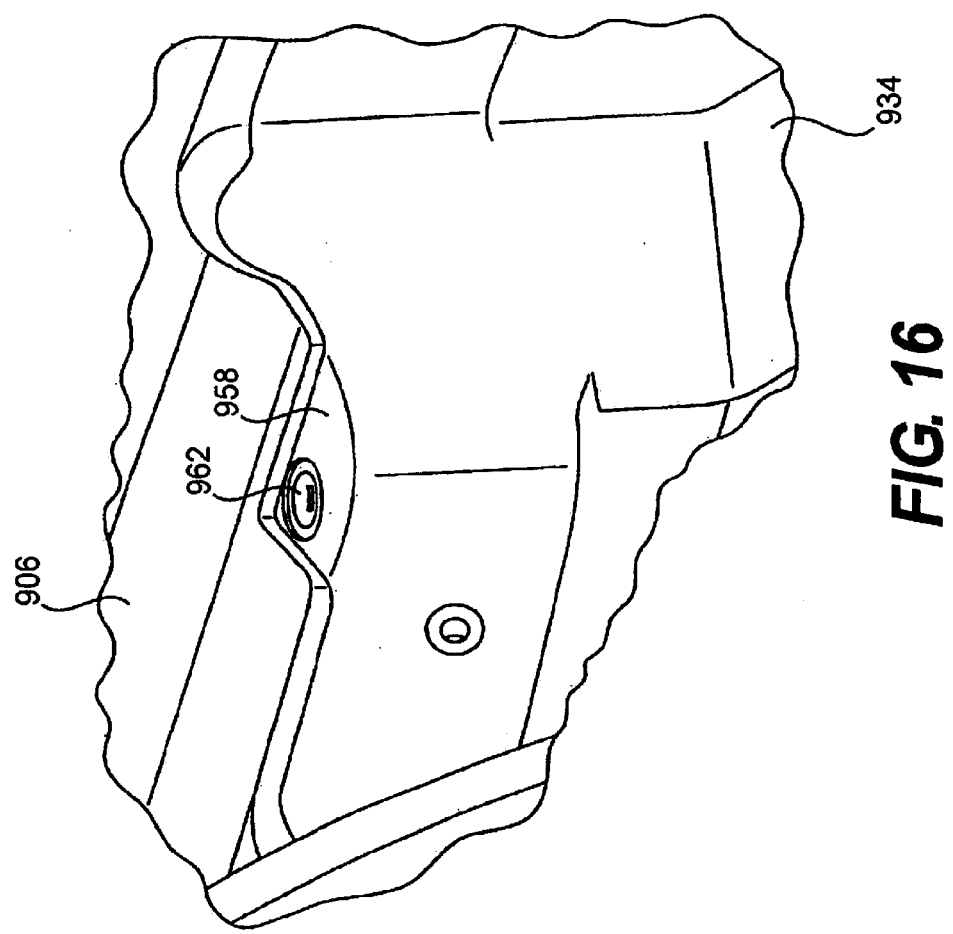
FIG. 16 is a perspective view showing the air box of the air intake system attached to the frame of an ATV.

The body 950 has a plurality of integral or separately formed flat tabs 958 that extend outwardly therefrom, as shown in FIGS. 11, 13, and 15. Each tab 958 has an aperture 960 bored therethrough. Fasteners 962, such as bolts, are inserted through the apertures 960 and into cooperating openings in the upper member 906 to secure the air box 934 to the support module 914, as shown in FIGS. 13 and 16. The upper surface 964 of the body 950 is generally planar so as to complement the inner peripheral surface of the upper member 906 when engaged therewith. FIGS. 12, 13, and 16 show the air box 934 secured to the inner peripheral surface of the upper frame member 906. As illustrated, three fasteners 962 secure the air box 934 to the upper frame member 906. Alternatively, the apertures and/or tabs may be omitted and the air box 934 may be mounted to the support module 914 in any other suitable manner.

Figure 14:
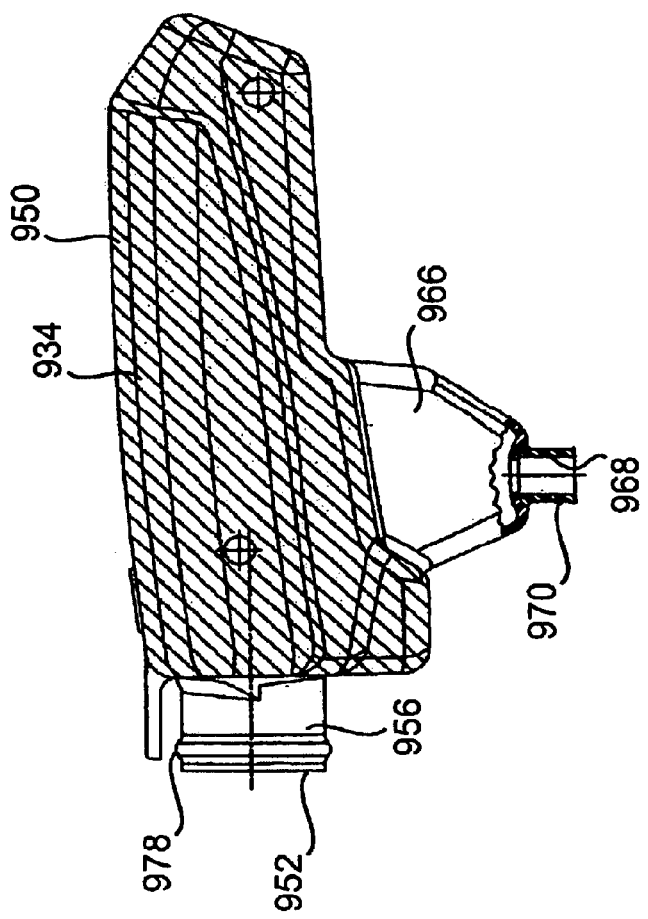
FIG. 14 is a partial cross-sectional view of the air box of the air intake system.

The air box 934 has a downwardly extending tapered extension 966 that leads to an opening 968, as shown in FIG. 14. An annular flange 970 extends outwardly from the opening 968, as shown in FIG. 14. The drain tube 948 is secured to the flange 970 by a clamp 972 (shown on FIGS. 12 and 13) to seal the opening 968. The drain tube 948 may be removed to allow water or debris within the air box 934 to be drained or removed.

Figure 17A:
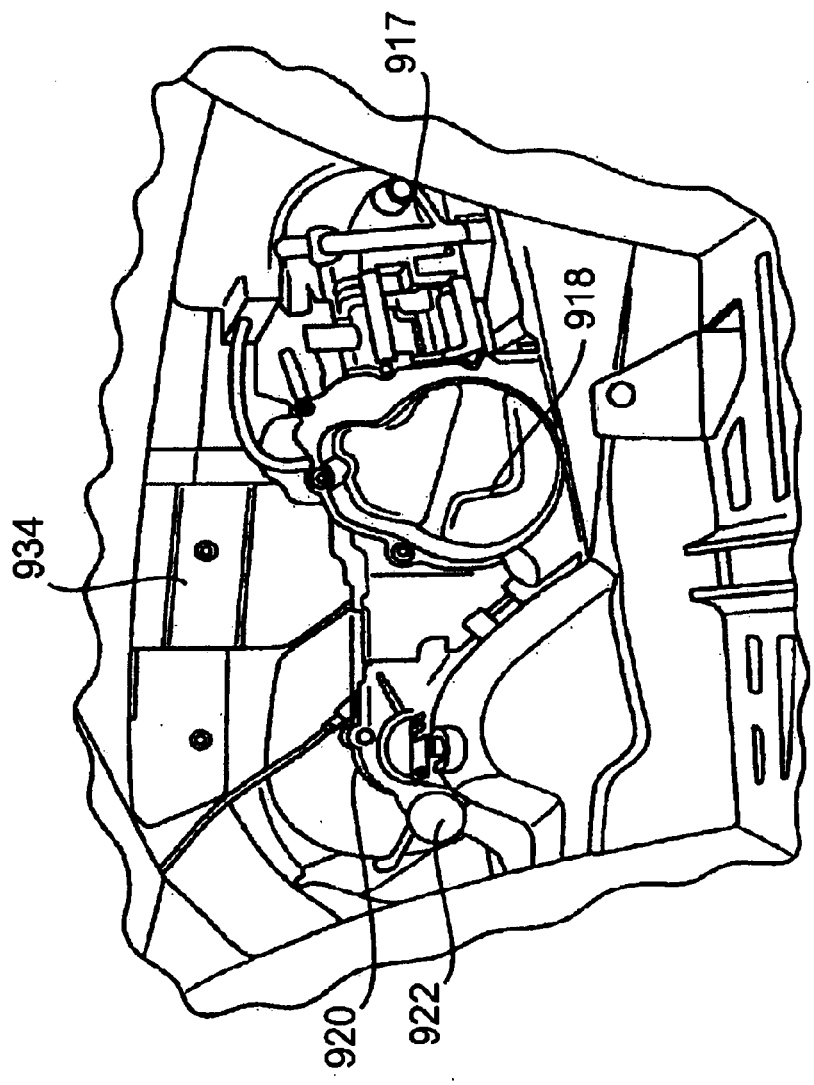
FIG. 17A is a side view of an ATV showing the air box of the air intake system and a transmission handle at a position away from the air box.
Figure 17B:
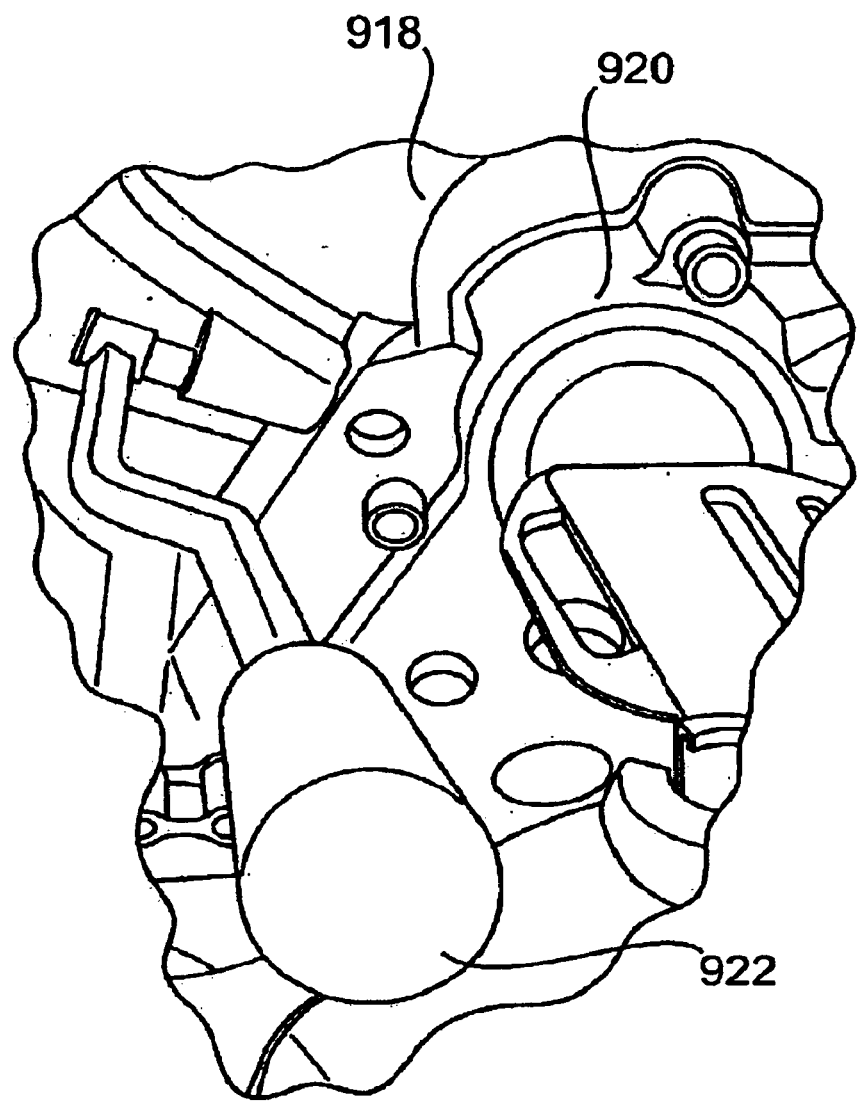
FIG. 17B is a perspective view showing a transmission handle at a position away from the air box.
Figure 17C:
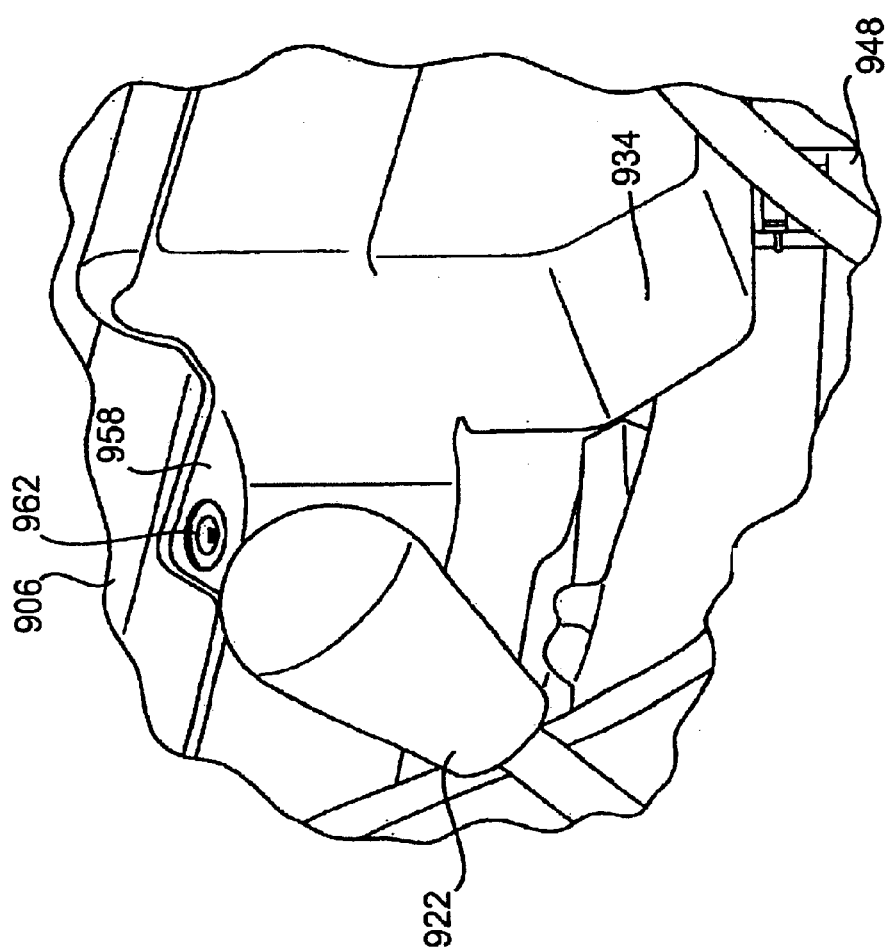
FIG. 17C is a perspective view showing the air box of the air intake system attached to the frame of an ATV with a transmission handle adjacent thereto.

As shown in FIG. 17A, the air box 934 is positioned at an intermediate portion of the upper member 906 adjacent the transmission 920. The air box 934 is L-shaped to allow the handle 922 of the transmission 920 to be operatively moved into and out of the space between the legs of the L-shaped air box 934 thereof. FIGS. 17A and 17B show the handle 922 in a position out of the space between the legs of the L-shaped air box 934. FIG. 17C shows the handle 922 extending upwardly into the space provided between the legs of the L-shaped air box 934. The L-shape of the air box 934 is also suitable for attenuating sounds from the engine 918 and from the air being drawn therethrough.

Figure 18:
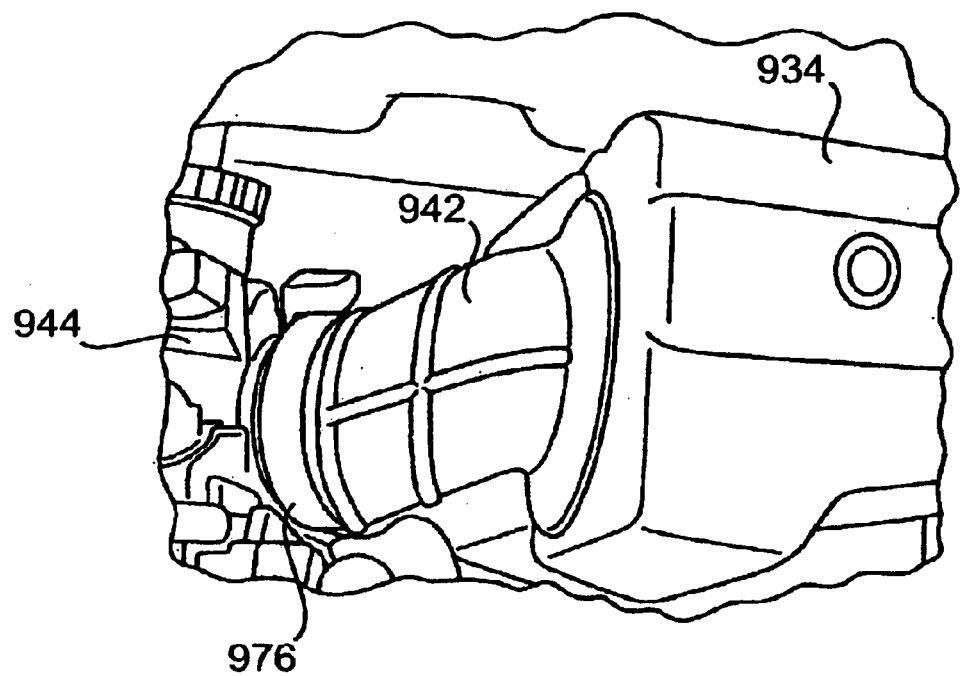
FIG. 18 is a perspective view showing the air box of the air intake system attached to the carburetor of the engine of the ATV.
Figure 21:
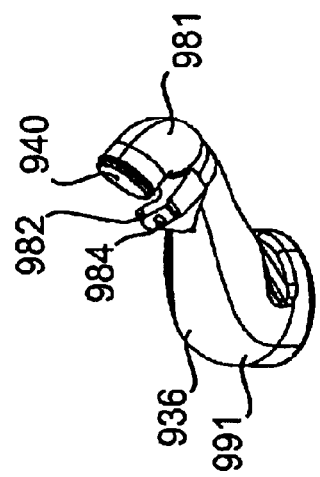
FIG. 21 is a third perspective view of an intake tube of the air intake system.
Figure 22:
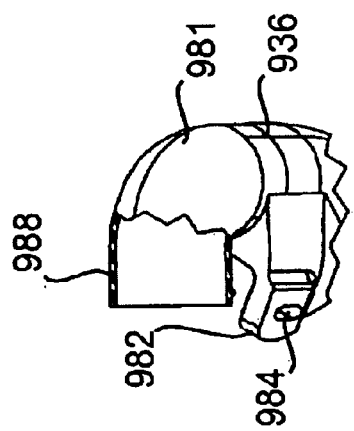
FIG. 22 is a partial cross-sectional view of an intake tube of the air intake system.
Figure 20:
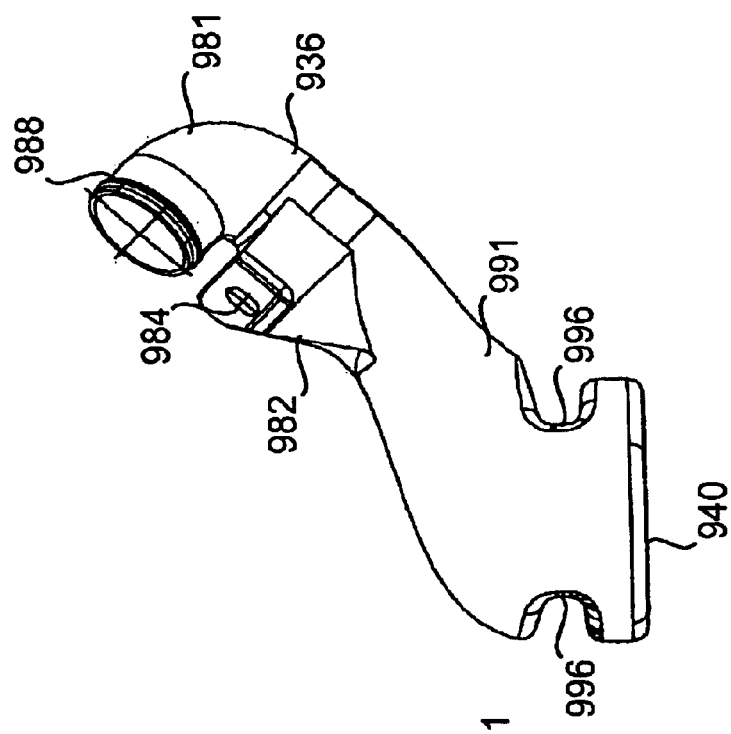
FIG. 20 is a second perspective view of an intake tube of the air intake system.
Figure 19:
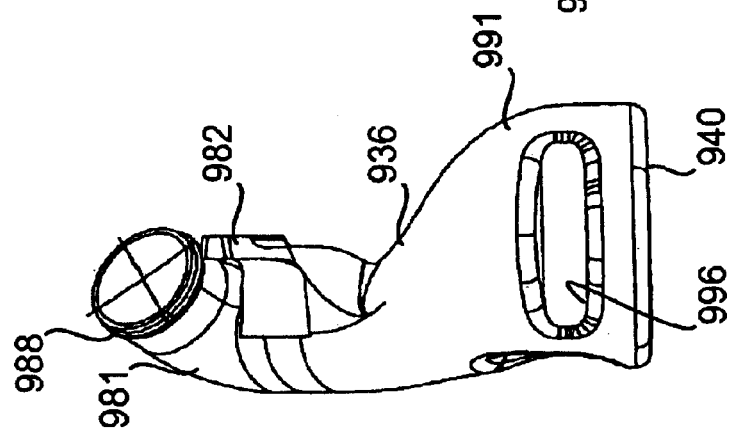
FIG. 19 is a perspective view of an intake tube of the air intake system.

As shown in FIGS. 8, 11, and 18, the intake duct 942 extends from the outlet port 954 to the carburetor 944 of the engine 918. Specifically, the intake duct 942 has a series of ridges 974 that secures one end of the intake duct 942 to the outlet port 954 of the air box 934. The opposite end of the intake duct 942 is secured to the carburetor 944 by a hose clamp 976.

As shown in FIG. 11. the tube 938 is engaged with the extension 956 provided on the inlet port 952. Specifically, the extension 956 has an annular protrusion 978 that engages the inner peripheral surface of one end of the tube 938 to secure the tube 938 to the extension 956, as shown in FIG. 14. A hose clamp 980 also holds the tube 938 on the extension 956 of the air box 934, as shown in FIGS. 7 and 11. The tube 938 extends along the upper frame member 906 with its opposite end connected to the intake tube 936.

The intake tube 936 is positioned at the front of the ATV 904 and extends generally upwardly and to the left of the upper frame member 906 (as viewed in FIGS. 8 and 10). The intake opening 940 extends generally upwardly and forwardly with respect to the frame member 906, as shown in FIGS. 7 and 9. However, the intake tube 936 may extend upwardly and to the right of the upper frame member 906 or may extend through an opening provided in the upper frame member 906.

As shown in FIGS. 19–22, the lower end 981 of the intake tube 936, opposite the intake opening 940, includes a lateral extension 982 with an aperture 984 bored therethrough. The lateral extension 982 may be formed separately from or integrally with the intake tube 936. A fastener (not shown in the figures), such as bolt, is inserted through the aperture 984 and into a cooperating opening in the upper frame member 906 to secure the intake tube 936 in its upright position to the support module 914, as shown in FIG. 7.

As shown in FIGS. 7 and 11, the lower end 981 of the intake tube 936 is connected to the opposite end of the tube 938. Specifically, the lower end 981 has an annular protrusion 988 that engages the inner peripheral surface of the opposite end of the tube 938 to secure the tube 938 to the lower end 981 of the intake tube 936, as shown in FIGS. 19–22. A hose clamp 990 (see FIGS. 7 and 11) also holds the tube 938 on the lower end 981 of the intake tube 936.

As shown in FIGS. 7, 9, and 11, the vent tube 946 extends from the upper end 991 of the intake tube 936 to the valve cover 917 of the engine 918. Specifically, the upper end 991 of the intake tube 936 has an opening 992 adapted to engage one end of the vent tube 946, e.g., with a friction fit. The vent tube 946 extends outwardly and downwardly from the upper end 991 of the intake tube 936 towards the valve cover 917 of the engine 918. A hose clamp 994 secures the opposite end of the vent tube 946 to an extension 919 provided on the valve cover 917. The vent tube 946 is structured to vent vapors from the valve cover 917. A positive crankcase ventilation valve ("PCV valve") may be positioned between the vent tube 946 and the valve cover 917 to control the flow of vapor from the valve cover.

Figure 23:
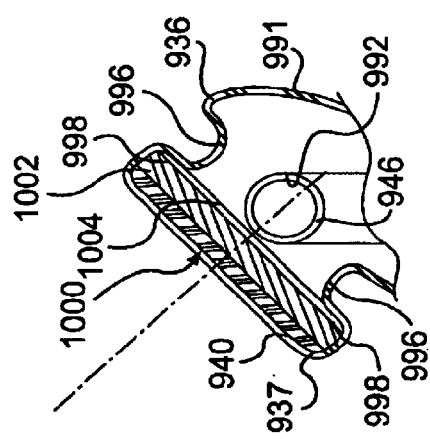
FIG. 23A is a partial cross-sectional view showing the filter assembly of the air intake system.
FIG. 23B is a top view of an embodiment of a filter of the filter assembly shown in FIG. 23.
FIG. 23C is a cross-sectional view of the filter shown in FIG. 23B.

As shown in FIG. 23, the upper end 991 of the intake tube 936 also includes a pair of inwardly extending portions 996 that provide support surfaces 998 for a filter assembly 1000. The filter assembly 1000 prevents the ingress of dirt and water particles from entering the engine 918.

Figure 24:
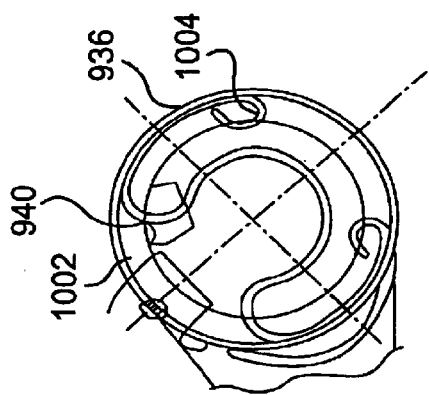
FIG. 24 is a top view showing the filter assembly of the air intake system.
Figure 25:
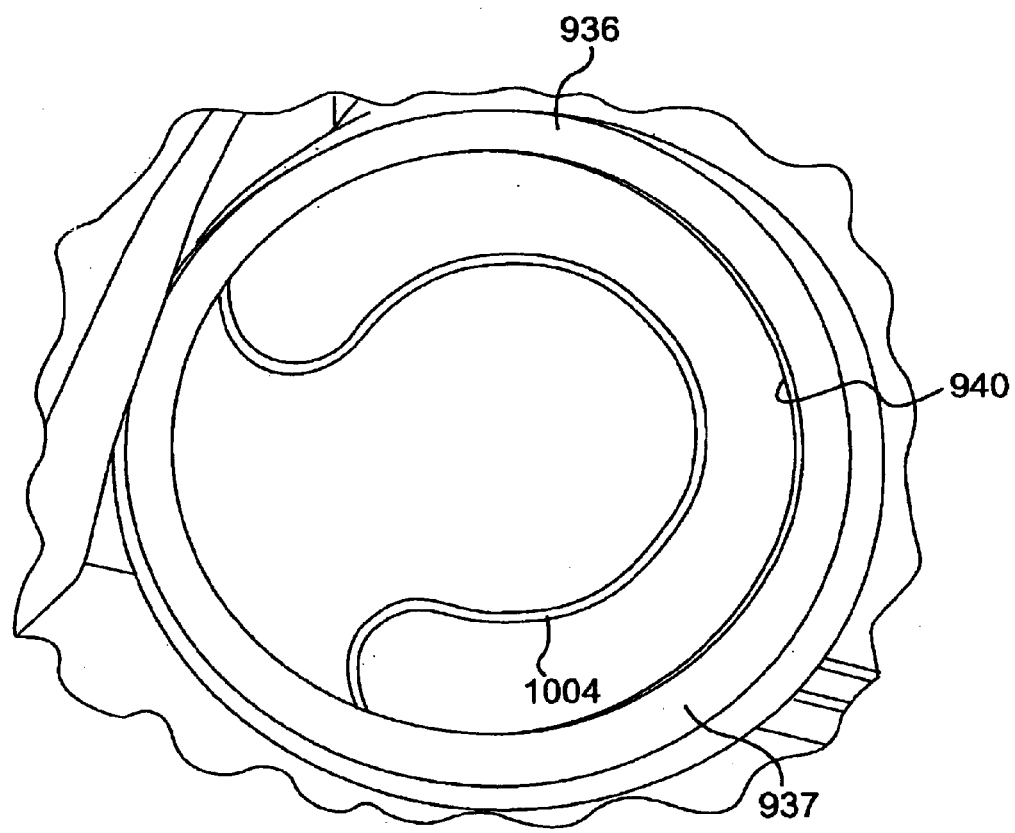
FIG. 25 is a top view showing a spring of the filter assembly of the air intake system.

As shown in FIGS. 23–25, the filter assembly 1000 includes a filter 1002 and a support structure 1004. In the illustrated embodiment, the support structure 1004 is in the form of a c-shaped spring. The spring 1004 is positioned within the upper end 991 of the intake tube 936 such that it rests against the support surfaces 998 of the inwardly extending portions 996. Moreover, the spring 1004 is self-biased in a generally radially outwardly direction in a free state, such that a diameter of the spring 1004 in the free state is larger than a diameter defined by the interior surface of the upper end 991 adjacent the intake opening 940. Thus, when the spring 1004 is positioned within the intake tube 936, the ends of the spring 1004 are biased into engagement with the interior surface to retain the spring 1004 in an operative position adjacent the intake opening 940.

Figure 23C:
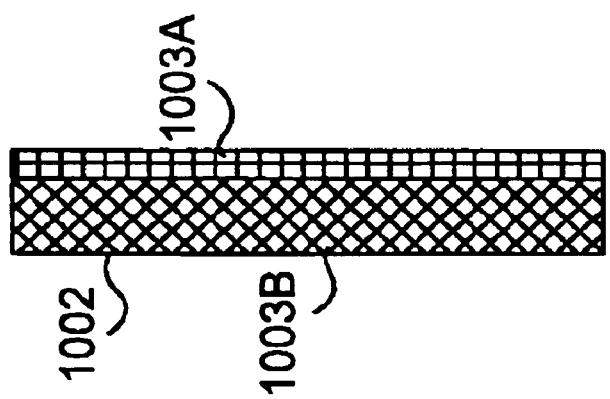
Figure 23B:
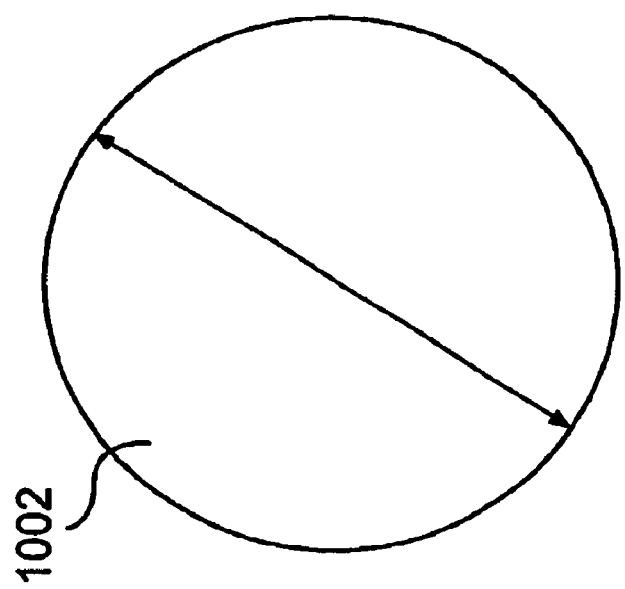

As shown in FIGS. 23, 23B, and 23C, the filter 1002, for example, may be in the form of a double layer foam pad and is positioned on top of the spring 1004 adjacent the intake opening 940. One layer of the foam pad may have a larger porosity than the other layer of the foam pad with the layer having the larger porosity facing outwardly from the intake opening 940. Preferably, the layer having the larger porosity faces outwardly from the intake opening 940.

For example, FIGS. 23B–23C illustrate an embodiment of a filter 1002 having a layer 1003A constructed of Polyester Polyurethane Foam (MF-20) and another layer 1003B constructed of Polyester Polyurethane Foam (MF-40). The layers 1003A, 1003B may be secured to one another by an adhesive such as glue, for example. As illustrated, the layer 1003A has a thickness that is less than a thickness of layer 1003B. However, the layers of the filter may have any suitable thickness and may be constructed from any suitable material.

Alternatively, the foam pad may be in the form of a single layer foam pad or may be any other multiple layer foam pad. The spring 1004 prevents the filter 1002 from entering into the inlet tube 936. Further, the edges 937 of the intake tube 936 are crimped radially inwardly to prevent withdrawal of the filter 1002 from the intake tube 936. The spring 1004 and filter 1002 are generally circular to complement the cross-sectional shape of the intake tube 936. However, the spring 1004 and filter 1002 may have any other suitable shape that corresponds with the shape of the upper end 991 of the intake tube 936.

The support structure 1004 may have any other suitable structure for supporting the filter 1002 within the intake tube 936. For example, the support structure may be any suitable member that is structured to engage the interior surface of the intake tube 936. The support structure may simply be one or more cross-members that extend across the diameter of the intake tube 936 so as to support the filter 1002 thereon. The cross-members may be integrally formed with the intake tube 936 or formed separately and secured thereto.

Figure 26:
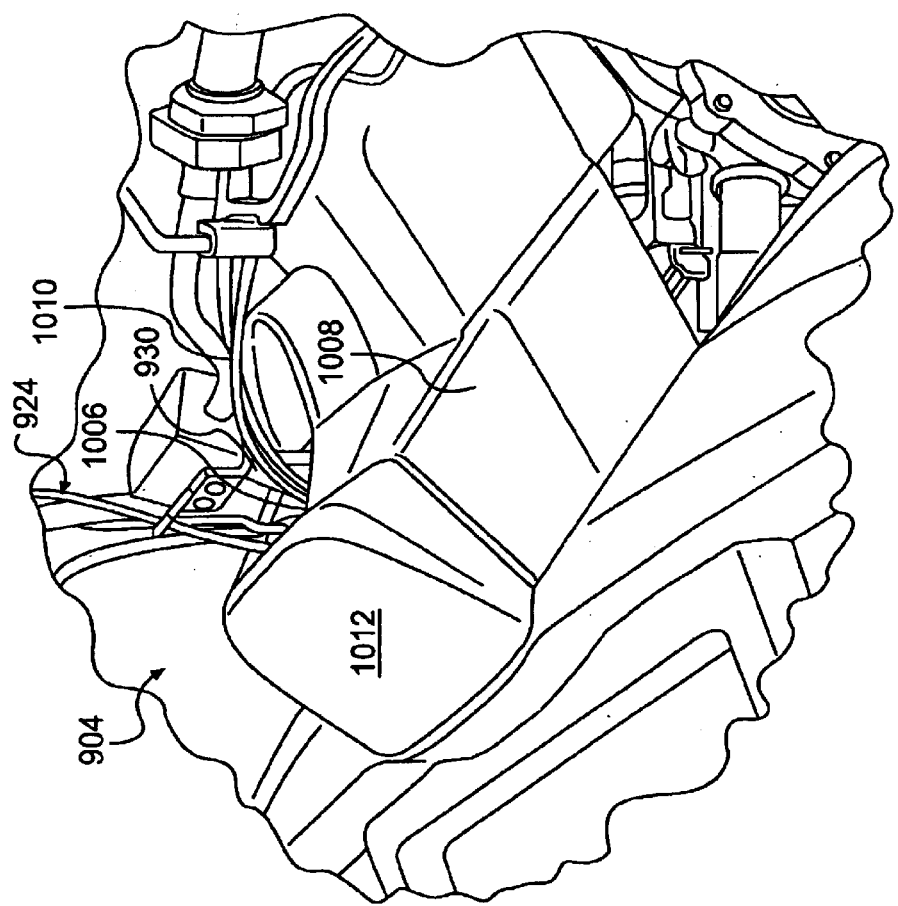
FIG. 26 is perspective view showing the body of the ATV.
Figure 27:
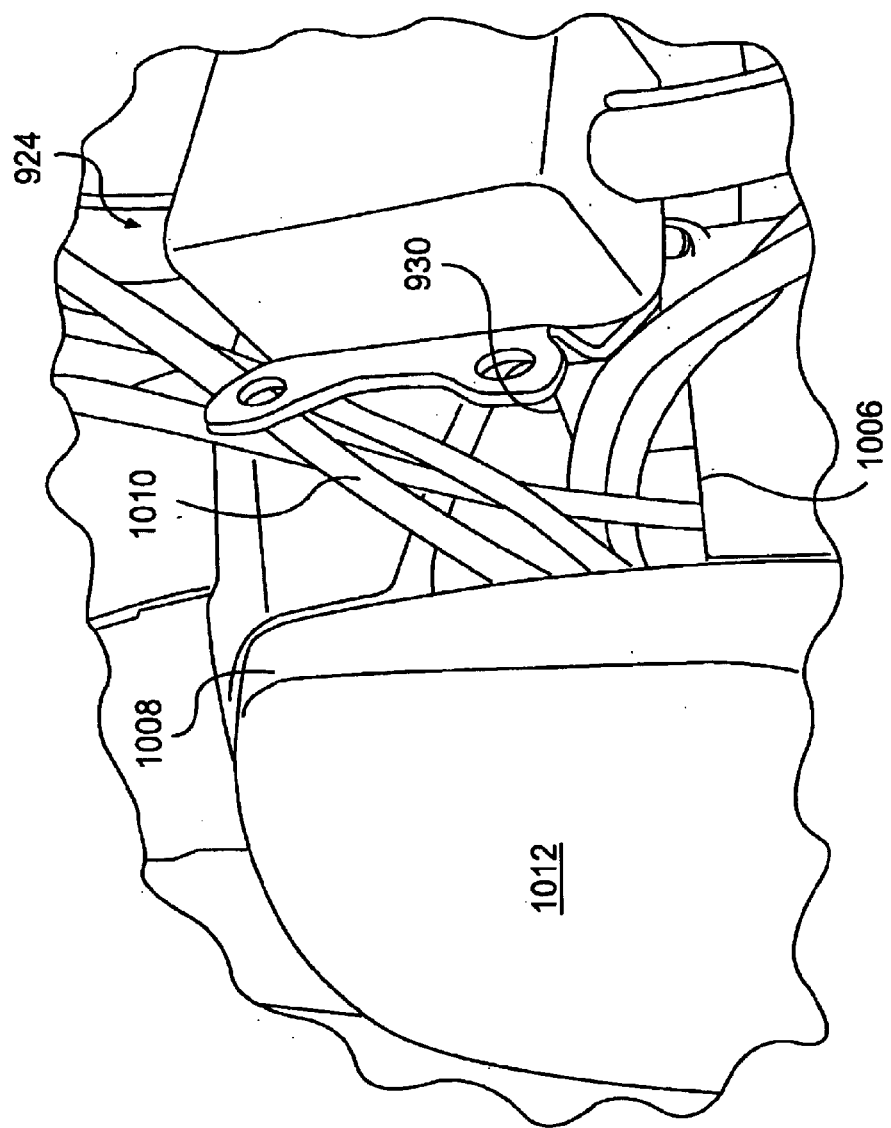
FIG. 27 is a perspective view showing a vent opening through the body of the ATV.

As shown in FIGS. 9 and 10, the intake tube 936 extends upwardly from the upper frame member 906 along with the steering column 930 of the steering assembly 924. The intake tube 936 is positioned adjacent to the steering column 930 so that the intake opening 940 of the intake tube 936 is positioned adjacent a ventilation opening 1006 that surrounds the steering column 930, as shown in FIGS. 26 and 27. As illustrated, the body 1008 attached to the support module 914 includes an opening 1006 that allows the steering column 930, as well as cables 1010 for the brake assembly, to pass therethrough. This opening 1006 also acts as a ventilation opening to allow air to enter the intake opening 940 of the intake tube 936. The intake opening 940 faces generally upwardly so as to face the generally upwardly facing ventilation opening 1006 adjacent the steering column 930.

Figure 28:
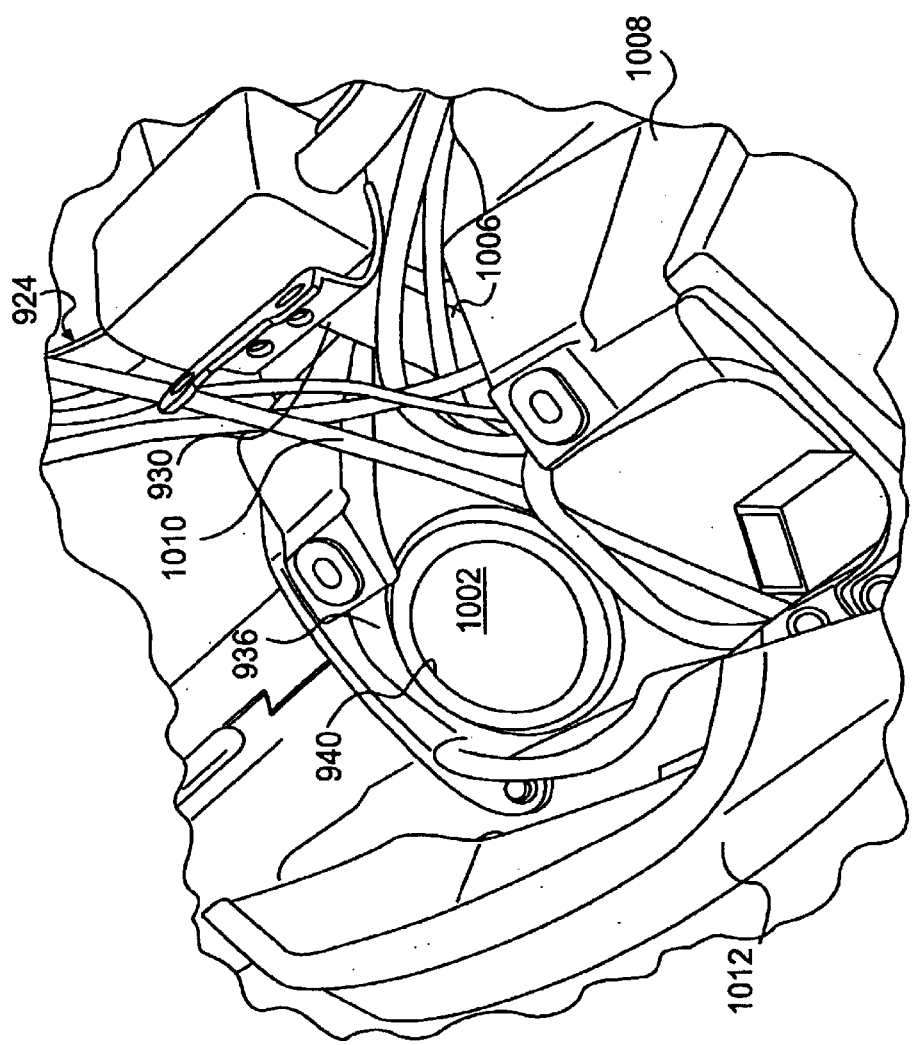
FIG. 28 is a perspective view showing a front portion of the body moved to an open position to allow access to the filter assembly of the air intake system.
Figure 29:
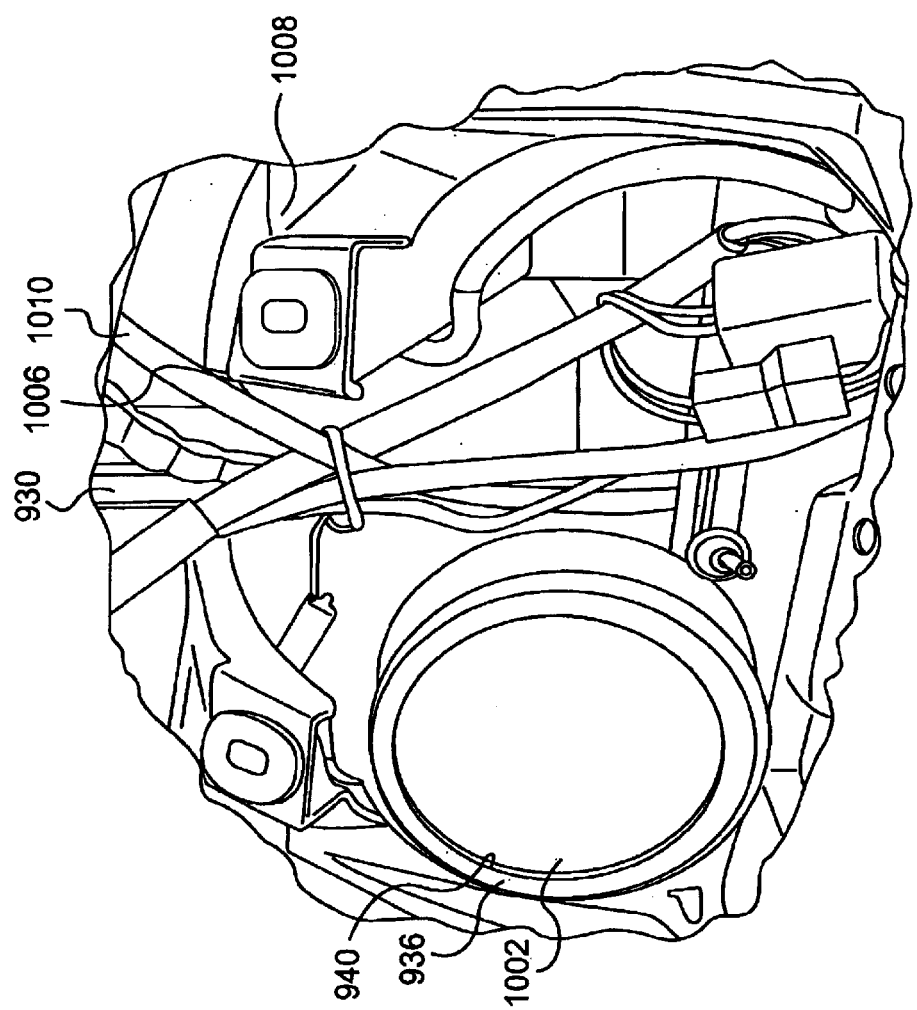
FIG. 29 is a perspective view showing a front portion of the body removed to allow access to the filter assembly of the air intake system.

As shown in FIGS. 28–29, a front portion 1012 of the body 1008 adjacent the steering column 930 is removable or pivotable to an open position to allow access to the intake opening 940 of the intake tube 936. Thus, the filter 1002, which is positioned at the intake opening 940 thereof, may be easily replaced. Further, the removable front portion 1012 of the body 1008 helps eliminate the ingress of mud or water splashed up from the wheels into the intake tube 936.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and scope of the disclosed embodiments.

What is claimed is:

1. An all terrain vehicle having a frame and front and rear wheels suspended from the frame, the vehicle comprising:
    a body structure attached to the frame having at least one ventilation opening;
    an engine mounted on the frame to provide a mode of power to at least one of the front and rear wheels;

an air box connected to the frame and supplying intake air to the engine, the air box including an intake tube connected to and receiving intake air from the at least one ventilation opening; and a filter disposed within the intake tube.

2. The all terrain vehicle according to claim 1, wherein the filter is positioned adjacent an intake opening of the intake tube.

3. The all terrain vehicle according to claim 2, wherein the body structure includes a removable portion adjacent the intake opening of the intake tube to allow access to the filter positioned adjacent the intake opening of the intake tube.

4. The all terrain vehicle according to claim 2, further comprising a support structure structured to retain the filter in the position adjacent the intake opening.

5. The all terrain vehicle according to claim 4, wherein the support structure is a spring.

6. The all terrain vehicle according to claim 5, wherein the spring is c-shaped.

7. The all terrain vehicle according to claim 6, wherein the c-shaped spring has ends that are biased into engagement with an interior surface of the intake tube to retain the c-shaped spring in the position adjacent the intake opening.

8. The all terrain vehicle according to claim 4, wherein the intake tube includes a pair of inwardly extending portions that provide support surfaces for the support structure.

9. The all terrain vehicle according to claim 1, wherein the filter is a double layer foam pad.

10. The all terrain vehicle according to claim 1, wherein the air box is generally L-shaped so as to accommodate a handle associated with the engine.

11. The all terrain vehicle according to claim 1, wherein the frame includes an upper frame member, a lower frame member and at least a first cross member and a second cross member extending between the upper and lower frame members to thereby define a closed perimeter with an engine receiving space therein.

12. The all terrain vehicle according to claim 11, wherein the intake tube extends upwardly from the upper frame member adjacent a steering column of the vehicle.

13. The all terrain vehicle according to claim 11, wherein the air box is secured to an inner peripheral surface of the upper frame member.

14. The all terrain vehicle according to claim 11, wherein the intake tube includes an intake opening that extends generally upwardly and forwardly with respect to the upper frame member.

15. The all terrain vehicle according to claim 1, further comprising a ventilation tube that extends from the intake tube and connects to a valve cover of the engine.

16. The all terrain vehicle according to claim 1, wherein the air box includes an outlet port communicated to a carburetor of the engine.

17. An air intake system comprising:

an air box enclosing an interior space, the air box having an inlet port and an outlet port, the inlet port enabling air to enter the air box, the outlet port being communicated to a carburetor of an engine;

an intake tube connected to the inlet port to direct air to the air box; and a filter disposed within the intake tube.

18. The air intake system according to claim 17, wherein the filter is positioned adjacent an intake opening of the intake tube.

19. The air intake system according to claim 18, further comprising a support structure structured to retain the filter in the position adjacent the intake opening.

20. The air intake system according to claim 19, wherein the support structure is a spring.

21. The air intake system according to claim 20, wherein the spring is c-shaped.

22. The air intake system according to claim 21, wherein the c-shaped spring has ends that are biased into engagement with an interior surface of the intake tube to retain the c-shaped spring in the position adjacent the intake opening.

23. The air intake system according to claim 19, wherein the intake tube includes a pair of inwardly extending portions that provide support surfaces for the support structure.

24. The air intake system according to claim 17, wherein the filter is a double layer foam pad.

25. The air intake system according to claim 17, wherein the air box is generally L-shaped.

26. The air intake system according to claim 17, further comprising a ventilation tube that extends from the intake tube and connects to a valve cover of the engine.

* * * * *